US 11,839,851 B2

(12) United States Patent
Klink

(10) Patent No.: US 11,839,851 B2
(45) Date of Patent: Dec. 12, 2023

(54) REACTOR SYSTEM INCLUDING A CATALYST BED MODULE AND PROCESS FOR THE SELECTIVE CATALYTIC REDUCTION OF NITROGEN OXIDES CONTAINED IN GAS STREAMS

(71) Applicant: SHELL USA, INC., Houston, TX (US)

(72) Inventor: Wassim Klink, Houston, TX (US)

(73) Assignee: SHELL USA, INC., Houston, TX (US)

( * ) Notice: Subject to any disclaimer, the term of this patent is extended or adjusted under 35 U.S.C. 154(b) by 0 days.

(21) Appl. No.: 17/732,965

(22) Filed: Apr. 29, 2022

(65) Prior Publication Data

US 2022/0355247 A1 Nov. 10, 2022

Related U.S. Application Data

(60) Provisional application No. 63/186,344, filed on May 10, 2021.

(51) Int. Cl.
*B01D 53/86* (2006.01)
*B01D 53/88* (2006.01)
(Continued)

(52) U.S. Cl.
CPC ....... *B01D 53/8631* (2013.01); *B01D 53/885* (2013.01); *B01J 21/063* (2013.01);
(Continued)

(58) Field of Classification Search
CPC ............. B01D 53/8631; B01D 53/885; B01D 2255/20707; B01D 2255/20723;
(Continued)

(56) References Cited

U.S. PATENT DOCUMENTS 6,419,889 B1  7/2002  Boxhoorn et al.
6,821,490 B2  11/2004 Platvoet
(Continued)

FOREIGN PATENT DOCUMENTS

JP   S62121638 A   6/1987
JP   2006212515 A  8/2006
(Continued)

OTHER PUBLICATIONS

International Search Report and Written Opinion received for PCT Patent Application No. PCT/US2022/028521, dated Aug. 26, 2022, 10 pages.

*Primary Examiner* — Timothy C Vanoy
(74) *Attorney, Agent, or Firm* — SHELL USA, INC.

(57) ABSTRACT

A reactor includes a catalyst bed module having a first grouping including a first plurality of foam catalyst blocks and a second grouping adjacent to the first grouping and having a second plurality of foam catalyst blocks A first back face of the first plurality of foam catalyst blocks and a second back face of the second plurality of foam catalyst face each other in a spaced relationship. The reactor also includes a sealing frame disposed between the first and second groupings and that may maintain the spaced relationship and form a sealed volume between the first and second plurality of foam catalyst blocks and a support frame having a support surface and an opening, the opening is positioned between the first grouping and the second grouping and adjacent to the sealed volume, and the sealed volume and the opening provide a passage for gas flow.

20 Claims, 9 Drawing Sheets

(51) Int. Cl.
  *B01J 35/04*    (2006.01)
  *B01J 23/22*    (2006.01)
  *B01J 21/06*    (2006.01)

(52) U.S. Cl.
  CPC .............. *B01J 23/22* (2013.01); *B01J 35/04* (2013.01); *B01D 2255/20707* (2013.01); *B01D 2255/20723* (2013.01); *B01D 2257/404* (2013.01)

(58) Field of Classification Search
  CPC ............ B01D 2257/404; B01D 53/565; B01J 21/063; B01J 23/22; B01J 35/04
  See application file for complete search history.

(56) References Cited

U.S. PATENT DOCUMENTS

| | | |
|---|---|---|
| 9,108,134 B2 | 8/2015 | Heidenreich et al. |
| 9,504,958 B2 | 11/2016 | Heidenreich |
| 2014/0050626 A1* | 2/2014 | Heidenreich ........ B01D 53/565 422/139 |
| 2022/0111334 A1 | 4/2022 | Klink et al. |

FOREIGN PATENT DOCUMENTS

| | | | |
|---|---|---|---|
| KR | 102204973 B1 | 1/2021 | |
| WO | 2009083593 A1 | 7/2009 | |
| WO | WO 2017 112 613 A1 * | 6/2017 | ......... B01D 53/8631 |

* cited by examiner

REACTOR SYSTEM INCLUDING A CATALYST BED MODULE AND PROCESS FOR THE SELECTIVE CATALYTIC REDUCTION OF NITROGEN OXIDES CONTAINED IN GAS STREAMS

CROSS-REFERENCE TO RELATED APPLICATION

The present application claims the benefit of priority of U.S. Provisional Application Ser. No. 63/186,344, filed May 10, 2021 which are incorporated herein by reference in their entirety.

The present disclosure relates to a system that includes a lateral flow reactor having a catalyst bed module and a process for the selective catalytic reduction of nitrogen oxides contained in exhaust gas streams.

BACKGROUND OF THE INVENTION

Lateral flow reactor systems are used in many different catalytic applications. Among these is the removal of nitrogen oxide compounds, or deNOx treatment, of exhaust gas streams from sources such as boilers in thermal power plants and waste incineration plants. The exhaust streams contain concentrations of nitric oxide (NO), nitrogen dioxide ($NO_2$), or both (referred to either individually or collectively as NOx). The NOx may be removed using the selective catalytic reduction method (SCR method) which reduces NOx to diatomic nitrogen ($N_2$) and water by contacting the exhaust gas with a reducing agent (e.g. ammonia) and a catalyst component of a lateral flow reactor system. The catalyst component of the lateral flow reactor system used in the SCR method typically includes an oxide of either vanadium (V), molybdenum (Mo), or tungsten (W) supported on a carrier including titania ($TiO_2$).

WO 2009/083593 discloses a reactor used for the removal of nitrogen oxides (NOx) from gas streams that contain NOx. The reactor includes a lateral flow reactor section. The lateral flow reactor section of the reactor includes a plurality of fixed catalyst beds each having a top end and bottom end and opposing side face walls. The top ends and bottom ends of each fixed catalyst bed are closed off with closing plates to prevent the flow of gas into the top and bottom ends of the fixed catalyst beds. The side face walls of each fixed catalyst bed remain partially open and permeable to the lateral flow of gas into and through the fixed catalyst beds. The fixed catalyst beds are arranged in a spaced-apart relationship to define passages of space between each fixed catalyst bed. Closing plates alternately close off the top of the passages of space defined by the spaced-apart fixed catalyst beds to thereby provide alternating top openings into the passages. Closing plates alternately close off the bottoms of the passages defined by the spaced-apart fixed catalyst beds that are not sealed off by top closing plates to thereby provide alternating bottom openings of the passages.

The structural arrangement of the lateral flow reactor section provides for directing the top-down flow of gas into the passages having top openings, laterally across and through the side face walls of the fixed catalyst beds, and out from the passages having bottom openings. It is significant to note that the lateral flow reactor section requires the top and bottom sides of the fixed catalyst beds to be sealed by closing plates to prevent the flow of gas into the fixed catalyst beds at these locations.

The catalyst component of the fixed beds may be any suitable catalyst that provides for the catalytic reduction of nitrogen oxides contained in a gas stream. Preferred among these catalyst compositions are those that include a titania carrier and a compound of one or more metals selected from vanadium, molybdenum, and tungsten. It is preferred for the catalyst to be in the form of trilobes, rifled trilobes or cylinders. However, there is no mention or suggestion of the use of foam catalyst.

WO 2017/112618 discloses a lateral flow reactor system for NOx removal from gas streams. The lateral flow reactor system has similar structural features to those of the lateral flow reactor section disclosed in WO 2009/083593. The fixed catalyst bed used in the lateral flow reactor system of WO 2017/112618, however, includes ceramic or metallic block foam catalyst support instead of a fixed bed of catalyst particles in the form of trilobes, rifled trilobes or cylinders. WO 2017/112618 discloses a lateral flow reactor section having spaced-apart fixed catalyst beds in the form of ceramic or metallic foam blocks having supported thereon a catalytic component. The fixed catalyst beds are closed at both the top and bottom ends. Closing plates provide for preventing gas flow from bypassing the fixed catalyst beds. The closing plates alternately close off top passages and bottom passages of the spaces defined by the spaced-apart fixed catalyst beds to direct a lateral flow of gas through the fixed catalyst beds. It is significant to note that the lateral flow reactor section requires the top and bottom sides of the fixed catalyst beds to be sealed by closing plates to prevent the flow of gas into the fixed catalyst beds at these locations.

U.S. Pat. No. 9,504,958 discloses a catalytic filter module for processing gaseous fluids. The module includes block-shaped filter and catalytic elements that are arranged spaced apart from one another within a sealed metal frame structure. The catalytic element includes an upstream feed face and a downstream discharge face which discharges the processed gas into a discharge channel with an open end for passing filtered and treated gas received from the catalytic element from the module.

U.S. Pat. No. 6,419,889 discloses a high activity and high selectivity catalyst useful for the low-temperature conversion of nitrogen oxide compounds (NOx) present in gas streams. The catalyst includes a high surface area titania carrier that is preferably impregnated with catalytic metals by contacting the carrier with a compound of a metal selected from the group consisting of vanadium, molybdenum and tungsten. The catalyst contains from 0.5 to 10% by weight metal. The preferred catalyst composition is in the form of trilobes, rifled trilobes, or cylinders. A feature of the catalyst providing for its high activity and selectivity is its bimodal pore distribution. However, the reactor and catalyst module configurations used in combination with the disclosed catalyst are not described.

JP 2006-212515A discloses a denitration catalyst for treating exhaust gases containing nitrogen oxides (NOx) using the selective catalytic reduction method which reduces NOx to nitrogen and water by contacting the exhaust gas with a reducing agent and the denitration catalyst. The denitration catalyst uses a foam having a high surface area to support a thin film of titanium oxide and vanadium oxide upon its skeletal surface. The denitration catalyst can be molded into a variety of shapes that can be used in various types of equipment. The Japanese publication discloses one particular shape and equipment arrangement that includes a catalyst layer and shape which provide for exhaust gas to flow through the catalyst layer in what is sometimes called the sidestream method. Gas inflow preventing plates are positioned at the top and bottoms of the catalyst shapes to regulate the flow direction of the exhaust gas.

There is an ongoing desire to develop improved, lower-cost catalytic reactor systems for use in nitrogen oxide removal from exhaust gas streams. These improved catalytic reactor systems provide for high NOx conversion at low temperatures and with low pressure drops across the catalytic reactor system.

SUMMARY OF THE INVENTION

Accordingly, in an embodiment, a reactor that may contact a gas stream with a catalyst composition includes a catalyst bed module having a first grouping including a first plurality of foam catalyst blocks each bounded by a first front face having a first surface area with an opposing first back face, a first top side with an opposing first bottom side, and a first side face with an opposing first alternate side face and a second grouping adjacent to the first grouping and having a second plurality of foam catalyst blocks each bounded by a second front face having a second surface area with an opposing second back face, a second top side with an opposing second bottom side, and a second side face with an opposing second alternate side face. The first back face of the first plurality of foam catalyst blocks and the second back face of the second plurality of foam catalyst face each face the other in a spaced relationship. The reactor also includes a sealing frame disposed between the first and second groupings and that may maintain the spaced relationship and form a sealed volume between the first plurality of foam catalyst blocks and the second plurality of foam catalyst blocks and a support frame having a support surface and an opening and that may support the first grouping and the second grouping. The first grouping and the second grouping are secured to the support surface such that the opening is positioned between the first grouping and the second grouping and adjacent to the sealed volume, and the sealed volume and the opening provide a passage for gas flow.

In another embodiment, a catalyst bed module includes a first grouping having a first plurality of foam catalyst blocks each bounded by a first front face having a first surface area with an opposing first back face, a first top side with an opposing first bottom side, and a first side face with an opposing first alternate side face and a second grouping adjacent to the first grouping and having a second plurality of foam catalyst blocks each bounded by a second front face having a second surface area with an opposing second back face, a second top side with an opposing second bottom side, and a second side face with an opposing second alternate side face. The first back face of the first plurality of foam catalyst blocks and the second back face of the second plurality of foam catalyst face each face the other in a spaced relationship. The catalyst bed module also includes a sealing frame disposed between the first and second groupings and that may maintain the spaced relationship and form a sealed volume between the first plurality of foam catalyst blocks and the second plurality of foam catalyst blocks. The sealing frame includes a cross element that may enclose the sealed volume and maintain the spaced relationship and extended rim bypass elements extending outwardly from and orthogonal to the cross element for a length. The catalyst bed module further includes a support frame having a support surface and an opening. The support frame may support the first grouping and the second grouping, the first grouping and the second grouping are secured to the support surface such that the opening is positioned between the first grouping and the second grouping and adjacent to the sealed volume, and the sealed volume and the opening provide a passage for gas flow.

In a further embodiment, a process for selective catalytic reduction of nitrogen oxide compounds contained in a gas stream, having an NO concentration, an $NO_2$ concentration, or concentrations of both compounds includes introducing the gas stream into a reaction zone defined by a vessel. The reaction zone includes a catalyst bed module having a first grouping having a first plurality of catalyst blocks and a second grouping having a second plurality of catalyst blocks and a sealing frame disposed between the first and second groupings and that may maintain a spaced relationship and form a sealed volume between the first plurality of foam catalyst blocks and the second plurality of foam catalyst blocks. Each catalyst block in the first and the second plurality of catalyst blocks includes a front face with an opposing back face, a top side with an opposing bottom side, and a side face with an opposing alternate side face. The top side, side face, and alternate side face of the first and second plurality of foam catalyst blocks forming an outer perimeter of the first grouping and the second grouping are uncovered, and the first and the second plurality of catalyst blocks may remove the nitrogen oxide compounds. The process also includes passing the gas stream through the catalyst bed module under deNOx removal reaction conditions and recovering a treated gas stream having a reduced concentration of NO or $NO_2$, or both, relative to the NO concentration, the $NO_2$ concentration, or the concentrations of both compounds.

DETAILED DESCRIPTION

Certain existing structural designs of lateral flow reactor (LFR) systems generally require all the sides of their fixed catalyst beds, other than the gas entry and exit faces, to be sealed in order to direct the gas flow laterally through the catalyst beds of the system. For example, without sealing the sides of the fixed catalyst beds, a NOx-containing gas flowing through the gas entry face may exit the catalyst bed through the unsealed sides rather than the exit face. As such, the NOx-containing gas may not be in contact with the catalyst bed for a time sufficient to achieve the desired deNOx removal. Therefore, the top, bottom, and sides of the catalyst beds are sealed or covered, leaving only front (gas entry side) and back (gas exit side) sides of the catalyst bed uncovered. That is, the NOx-containing gas bypasses the catalyst bed through the unsealed and open sides and, therefore, is not treated for NOx removal. However, fabrication of the existing covered fixed catalyst bed structures is costly due to the complexities associated with the design and construction of the fully sealed-up sides. Therefore, it is desirable to have a lower cost, higher efficiency fixed catalyst bed design that provides for enhanced NOx conversion and for the low pressure drop benefits associated with the use of LFR systems compared to existing systems.

The present disclosure addresses some of the problems with construction complexity and cost by providing a simpler structural design for fixed catalyst beds used in LFR systems. This simpler design eliminates some of the requirements for the complicated sealing of the different sides of the catalyst beds of a lateral flow reactor needed to provide passages for and direct the lateral flow of a gas stream to be treated in the reactor, and that results in the desired residence time of the gas stream in the catalyst bed. The catalyst bed disclosed herein includes a frame support designed in a manner that the sides of the catalyst bed are not entirely sealed and the gas stream flowing through the catalyst bed remains in contact with the catalyst bed for a time sufficient to achieve the desired deNOx removal. While the fixed catalyst beds disclosed herein do not require sealing of the different sides, the disclosed structural design mitigates premature exit of the NOx-containing gas that generally occurs when the top, bottom, and side faces of the catalyst bed is not sealed or otherwise covered. Notably, as discussed in further detail below, fixed catalyst beds having the disclosed frame support unexpectedly provide for higher NOx conversion when used in combination with a lateral flow reactor for deNOx treatment of NOx-containing gas streams.

Additionally, the disclosed catalyst bed is easier and less costly to construct than conventional fixed catalyst beds used in LFR systems.

Figure 1:
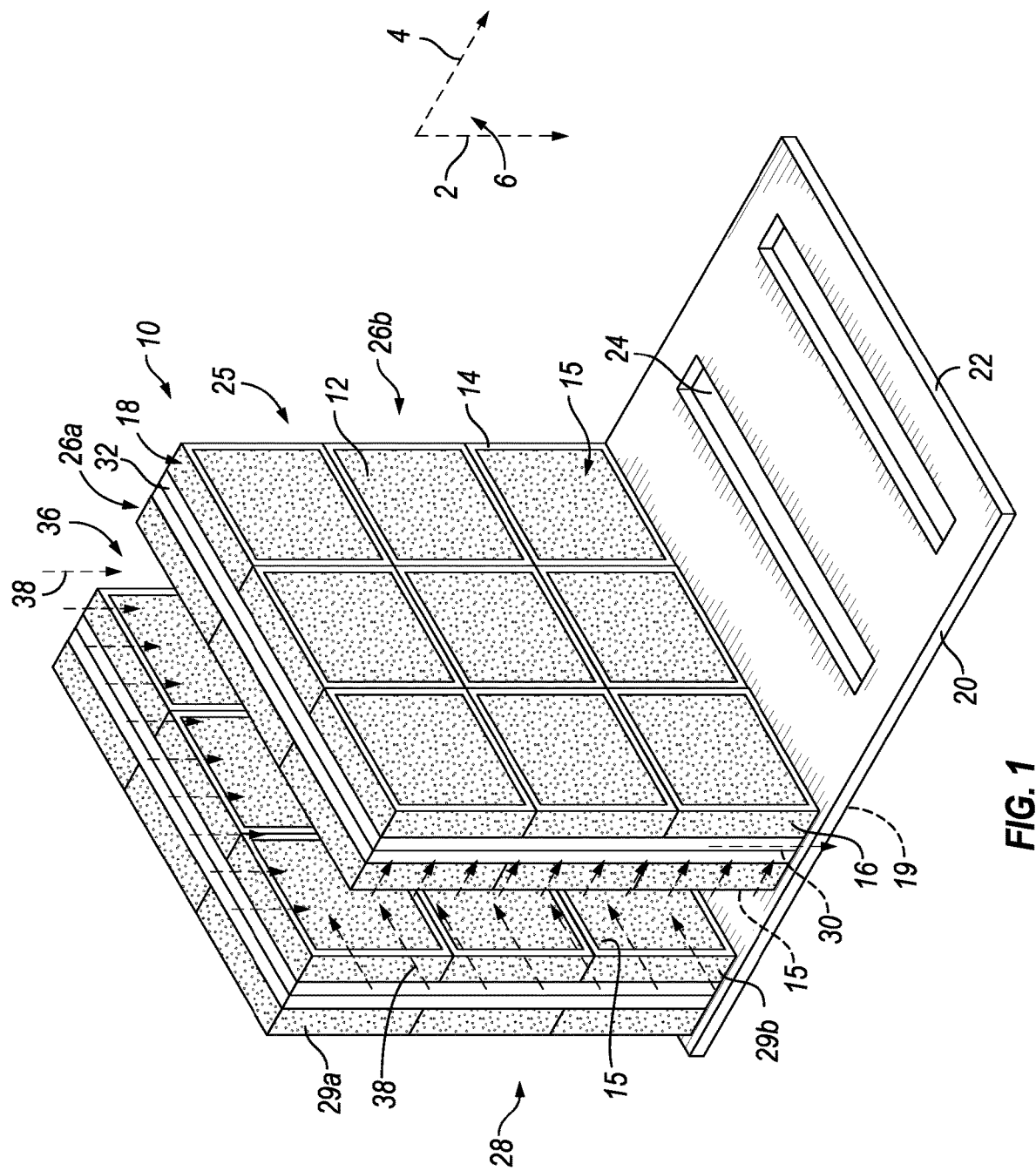
FIG. 1 is a perspective view of a catalyst bed module having multiple pairs groupings of foam catalyst blocks, whereby each pair of groupings is spaced apart from one another by a sealing frame and top and side faces of the foam catalyst blocks forming part of an outer perimeter of the groupings are uncovered, in accordance with an embodiment of the present disclosure.

With the foregoing in mind, FIG. 1 is a perspective view of a fixed catalyst bed module 10 that may be used in an LFR system having the frame support and seal disclosed herein. In the illustrated embodiment, the catalyst bed module 10 includes multiple foam catalyst blocks 12 arranged in groups that form a foam catalyst bed of the LFR system. The catalyst bed module 10 has an axial axis or direction 2, a radial axis or direction orthogonal to the axis 2, and a circumferential axis or direction 6 around the axis 2. The foam catalyst blocks 12 are arranged in a side-by-side stacked relationship and supported by a support frame 14, thereby forming a grid of foam catalyst blocks 12 called catalyst bed 25. The support frame 14 may be a unitary structure or made up of separate components (e.g., bars, tubes, or the like) held together by any suitable fastener (e.g., bolts, screws, clamps, or the like) arranged in a manner that contains the foam catalysts blocks 12. The support frame 14 may be removably or permanently coupled to the foam catalyst blocks 12. The catalyst bed module 10 may have any number of foam catalyst blocks 12 in each grouping. For example, the number of foam catalyst blocks 12 may be 1, 2, 3, 4, 5, or more arranged side-by-side, stacked, or in a side-by-side stacked relationship. The support frame 14 may be coupled, or attached, to a front face 15, or inlet side, of each foam catalyst block 12 by any suitable attachment means. By way of non-limiting example, the support frame 14 may be attached, or otherwise coupled, to the catalyst blocks 12 via bolts, clips, adhesives, fasteners, or any other suitable attachment means and combinations thereof.

Unlike existing LFR systems that use catalyst modules having the entirety of the side faces of the foam catalyst sealed or covered, the support frame 14 of the present disclosure is designed such that side faces 16 of the catalyst blocks 12 are substantially open (i.e., uncovered, unsealed). For example, as shown in the illustrated embodiment, the side face 16 of the catalyst blocks 12 on the outmost perimeter of the catalyst bed module 10 are not sealed or otherwise covered. In certain embodiments, a portion of the support frame 14 may have a lip that wraps around the catalyst blocks 12 located on the outermost perimeter of the catalyst bed module 10 such that the portion of the support frame 14 covers a portion of the side face 16, a top face 18 and a bottom side 19 of the catalyst blocks 12 on the outermost perimeter of the catalyst module 10. For example, the support frame 14 may cover between 1% and 5% of a portion of the side face 16 and top face 18.

As shown in the illustrated embodiment, the catalyst beds 25, 28 are mounted and secured on a surface 20 of a support 22. The catalyst beds 25, 28 may be secured onto the surface 20 using any suitable attachment means such as, but not limited to, bolts, clips, adhesives, welding, brazing or any other suitable attachment means and combinations thereof. In the illustrated embodiment, the catalyst beds 25, 28 are mounted and secured on the surface 20 such that the catalyst bed module 10 is orthogonal to the surface 20. However, in other embodiments, the catalyst beds 25, 28 are mounted and secured onto the surface 20 such that the catalyst bed module 10 is slanted, thereby creating an acute angle between the catalyst bed module 10 and the surface 20.

The support 22 includes an opening 24 that provides a passage (or outlet) for a treated gas stream that has passed through and been treated by the catalyst bed module 10. For example, as shown in the illustrated embodiment, the catalyst bed module 10 includes a first catalyst bed 25 having catalyst block groupings 26a, 26b in a spaced apart relationship, and a second catalyst bed 28 having catalyst block groupings 29a, 29b in a spaced apart relationship. As should be appreciated, the catalyst bed module 10 may have any number of catalyst beds, each having a pair of catalyst block groupings in a spaced apart relationship. Each catalyst bed 25, 28 is arranged on the support 22 such that the opening 24 is positioned between each grouping 26, 29 in the respective catalyst bed 25, 28.

To facilitate discussion of the catalyst bed 25, 28 of FIG. 1, reference will only be made to the catalyst bed 25. As should be appreciated, the catalyst bed 28 and any other catalyst bed in the in the catalyst bed module 10 is arranged and functions in the same manner as the catalyst bed 25. As shown in the illustrated embodiment, the groupings 26a, 26b are spaced apart and arranged back-to-back such that back face 30a, or outlet side, of each catalyst block 12 in the grouping 26a is facing the back 30b of each respective catalyst block 12 in the grouping 26b. Between the two groupings 26a, 26b is a gap that aligns with the opening 24 to form a passage between the groupings 26a, 26b, as discussed in further detail below with reference to FIG. 2.

The catalyst bed 25 includes a sealing frame 32 between the groupings 26a, 26b that extends along a portion of the outermost perimeter of the catalyst bed 25. For example, as shown in the illustrated embodiment, the sealing frame 32 is positioned adjacent to the outlet side (e.g., the back face 30) of the catalyst bed 25 and abuts the sides faces 16, the top face 18, and the bottom side 19 of the catalyst blocks 12 positioned on the outermost perimeter of the groupings 26, thereby forming a frame around the outlet side of the catalyst bed 25, 28. The sealing frame 32 maintains the spaced relationship between the groupings 26a, 26b by keeping them spaced apart to thereby form an open space (e.g., gap) between them. The sealing frame 32 also provides for sealing the open space in a gas-tight manner to form a sealed volume defined between the back faces 30 (i.e., outlet side) by three sides of the foam catalyst blocks 12 and the sealing frame 32.

In operation, an LFR having the catalyst bed module 10 receives a NOx-containing gas stream that flows into one or more inlets 36 of the catalyst bed module 10, as shown by arrows 38. The inlet 36 of the catalyst bed module 10 is positioned between the catalyst beds 25, 28 at the front face side 15 of each catalyst block 12 in the respective grouping 26, 29. For example, in the illustrated embodiment, the front face sides 15 of the catalyst blocks 12 in the grouping 26b of the first catalyst bed 25 are facing the front face sides 15 of the catalyst blocks 12 in the grouping 29 of the second catalyst bed 28. That is, the catalyst beds 25, 28 are spaced apart and arranged in a back-to-back relationship on the support 22, thereby creating a space between one another that defines the inlet 36.

The NOx-containing gas stream 38 may flow into the inlet 36 from the axial direction 2 (e.g., the top side of the catalyst bed module 10) and the radial direction 4 (e.g., the sides of the catalyst bed module 10). While in the inlet 36, the NOx-containing gas stream 38 changes directions relative to the axial direction 2 and the radial direction 4, and flows into and through the front face side 15 (i.e., inlet side) of the catalyst blocks 12 in the respective catalyst bed 25, 28 of the catalyst bed module 10. For example, as shown in the illustrated embodiment, the flow of the NOx-containing gas stream 38 into the front face side 15 (or inlet side) of the catalyst blocks 12 is in a direction that is substantially orthogonal to the direction 2, 4, thereby flowing laterally through the catalyst bed module 10. After passing through and exiting the catalyst blocks through the back face 30 (or outlet side) and into the passage between the groupings 26a, 26b, 29a, 29b, a treated gas stream changes flow direction and exits the catalyst bed module 10 through the opening 24 in the direction 2.

The disclosed system does not provide a perfect lateral flow because the catalyst bed module 10 allows at least a portion of the gas stream 38 to flow through the top, bottom and side ends of the catalyst beds 25, 28 instead of the entire gas flow passing directly into a single face (i.e., the front face 15 or inlet side) of the catalyst blocks 12. However, LFR systems having the disclosed catalyst bed module 10 yields the benefits of conventional LFR systems even though the pattern of gas flow through the LFR system is not perfectly lateral. Unlike the disclosed catalyst bed module 10, existing catalyst bed modules for LFR systems attempt to seal off the top, bottom and side ends of their catalyst beds to prevent gas inflow at those locations and to direct the gas flow laterally into a single face of the catalyst beds. The disclosed catalyst bed module 10, on the other hand, allows the ends of the foam catalyst blocks 12 to be substantially open and uncovered to permit gas flow into the foam catalyst blocks 12 at these locations. This feature of the reactor system disclosed herein unexpectedly enhances NOx conversion in deNOx process applications by increasing a residence time of at least a portion of the NOx-containing gas stream 38 in the catalyst module 10. For example, it was surprisingly found that a portion of the NOx-containing gas stream 38 exited the catalyst bed module 10 through the top side 18 and side faces 16 of the catalyst blocks 12 on the outer perimeter of the catalyst module 10, reversed its flow, and re-entered the inlet 36 and passed laterally through the front face 15 before exiting through the back face 30. As such, the portion of the NOx-containing gas steam 38 is re-treated by the catalyst block 12 it re-enters, thereby increasing the residence time of the NOx-containing gas stream 38 and increased NOx removal efficiency.

As discussed above, certain existing LFR systems use catalysts bed modules having foam catalysts that are sealed or covered on the side faces. Such a configuration increases the complexity and overall manufacturing cost of the catalyst bed module. However, by using the support frame 14 and the sealing frame 32 disclosed herein, the side faces 16 of the catalyst blocks 12 on the outermost perimeter of the catalyst bed module 10 may remain open (e.g., uncovered), thereby allowing the gas stream 38 to flow into the catalyst beds 25, 28 through both the top, bottom and sides.

The disclosed catalyst bed module 10, when used in a reactor, provides for contacting of the gas stream 38 with spaced-apart foam catalyst blocks 12 that may provide for substantially lateral flow of the gas stream 38 into and through the foam catalyst blocks 12 within the reactor. The gas stream 38 is contacted with a catalyst component supported on the foam blocks 12. What is meant by the phrase "substantially lateral flow of gas" is that the disclosed reactor system is unlike existing conventional lateral flow reactor systems in that the reactor system disclosed herein allows for at least partial flow of the gas stream 38 into and through unsealed sides 16 of the foam catalyst blocks 12. The existing lateral flow reactors, on the other hand, have their catalyst beds or blocks sealed in a gas-tight manner on all their sides, other than the entry and exit faces, in order to direct the flow of gas laterally through the catalyst beds or blocks. Reactor systems that use the disclosed catalyst bed module 10 are different in that it provides for flow of gas through top, bottom, front, and side faces of the foam catalyst blocks 12. It is unexpected, as noted above, that this unique structural design and arrangement of the disclosed catalyst module 10, provides for enhanced NOx conversion in a deNOx operation.

The disclosed the catalyst module 10 may form part of a reaction zone in LFR systems to provide for a low-temperature, low-pressure drop process for the selective catalytic reduction of nitrogen oxide compounds contained in gas streams having either an NO concentration or an $NO_2$ concentration, or concentrations of both compounds, such as the NOx-containing gas stream 38. For example, the LFR system includes a feed inlet that receives and introduces the NOx-containing gas stream 38 into the reaction zone having the disclose catalyst bed module 10. The NOx-containing gas stream 38 may come from a number of sources, including power plants, thermal cracking furnaces, incinerators, metallurgical plants, fertilizer plants, and chemical plants. These gas streams can have concentrations of nitrogen oxides in the range of from 10 to 10,000 ppm by volume, mainly nitrogen monoxide. The NOx-containing gas stream 38 may also contain from 1 to 200 ppm by volume sulfur oxides, mainly sulfur dioxide, from 1 to 10% by volume oxygen, from 0.5 to 15% by volume carbon dioxide, and from 5 to 40% by volume water vapor. Gas streams from fertilizer plants typically will have $NO_2$ concentrations exceeding 50 vol. %.

Once in the reaction zone, the NOx-containing gas stream 38 enters the catalyst beds 25, 28 through the front face 15, the sides 16, 19, and the top side 18 and passes through the foam catalyst blocks 12 of the catalyst module 10 in a substantially lateral gas flow. The NOx-containing gas stream 38 is contacted under deNOx removal reaction conditions with the catalyst component of the foam catalyst blocks 12. A reducing agent is added to the NOx-containing gas stream 38 that passes through and is contacted with the foam catalyst blocks 12. The preferred reducing agent is ammonia or an ammonia releasing compound. It is preferred for the amount of reducing agent added to the NOx-containing gas stream 38 is such that the molar ratio of reducing agent to NOx is around, and preferably slightly above the stoichiometrically required ratio in order to optimize NOx removal with a minimum amount of slip of the reducing agent. Suitable deNOx removal reaction conditions include a reaction temperature in the range of from 100 to 480° C., preferably from 110 to 400° C., more preferably from 110 to 350° C. and most preferably from 120 to 250° C. The reaction pressure can be in the range of from 0.9 to 20 bar. Gas hourly space velocity is in the range of from 500 to 50,000 $Nm^3/m^3$/hour.

Figure 2:
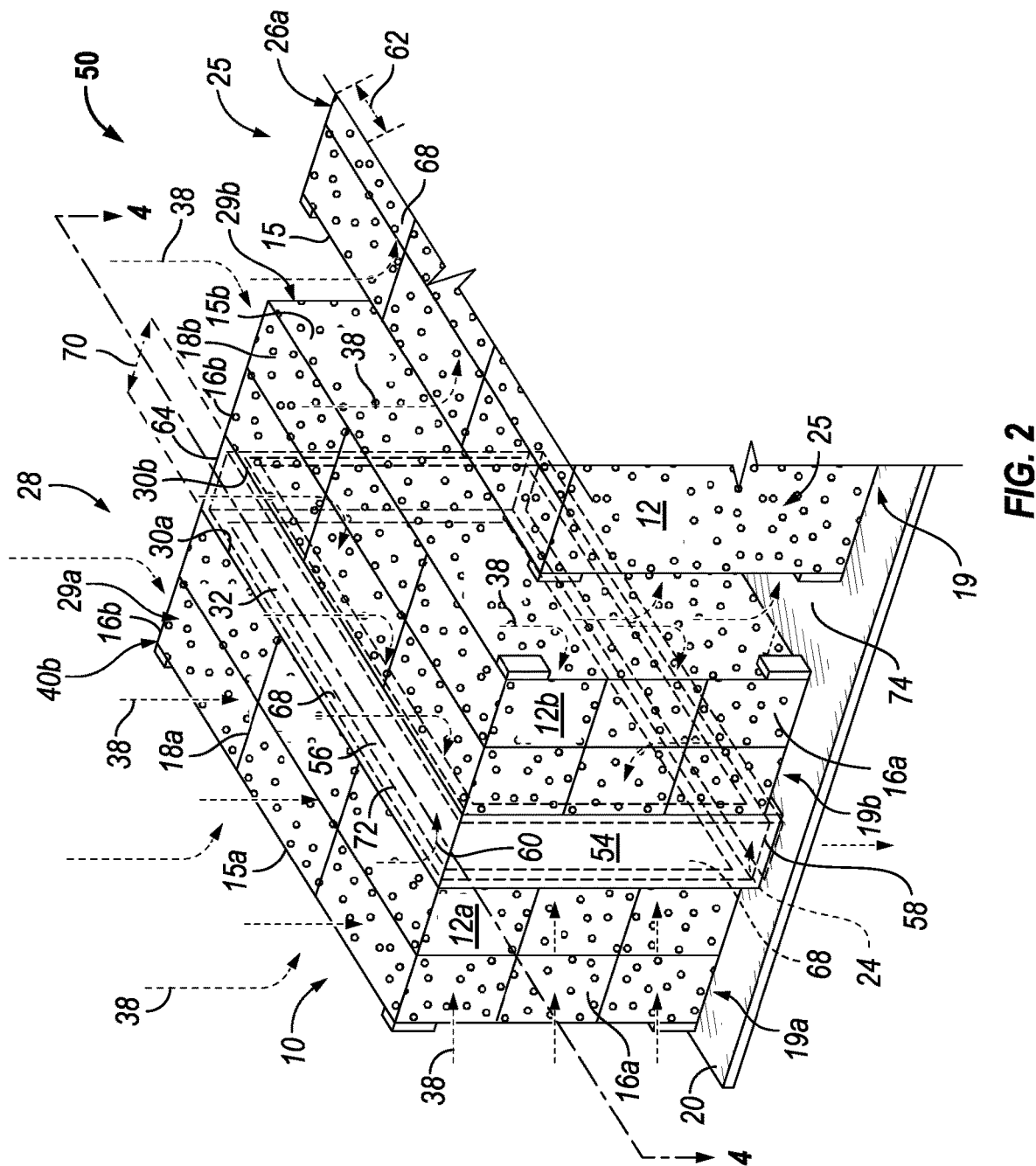
FIG. 2 is a perspective view of a portion of the lateral flow reactor having the catalyst bed module of FIG. 1 illustrating its components and operation, in accordance with an embodiment of the present disclosure.

As discussed above, the disclosed catalyst bed module 10 includes a plurality of foam catalyst blocks 12 arranged in groups (e.g., the groupings 26, 29) that are spaced apart by the sealing frame 32. The sealing frame 32 not only seals or encloses the space between the respective groupings 26, 29, but also allows for the side 16, top side 18 and bottom side 19 of each foam catalyst block 12 on the outermost periphery of each grouping 26, 29 to remain substantially uncovered. Additionally, the sealing frame 32 of the present disclosure blocks premature exit of the NOx-containing gas stream 38 through the open sides 16, 18 of the foam catalyst blocks 12 by forcing the NOx-containing gas stream 38 to penetrate deeper into the foam catalyst block 12 before exiting the catalyst block 12 through the back face 30, as discussed in further detail below. FIG. 2 is a perspective view of an end portion of a reactor 50 having the catalyst bed module 10 of the present disclosure. Certain features of the reactor 50 are not shown. However, the reactor 50 may be any suitable reactor used for the treatment and removal of NOx or other noxious gases from an exhaust gas generated in, for example, power plants, thermal cracking furnaces, incinerators, metallurgical plants, fertilizer plants, and chemical plants, among others. As discussed above, the catalyst bed module 10 includes multiple catalyst beds 25, 28, each having catalyst groupings 26, 29 that include a plurality of catalyst blocks 12 in a side-by-side stacked relationship. The groupings 26, 29 are oriented onto and operatively secured to the support surface 20 in a back-to-back spaced relationship with other groupings of the foam catalyst blocks 12. Each of the groupings 26, 29 provides the same function. To facilitate discussion of this embodiment, reference will only made to the catalyst blocks 12 in the grouping 29, or the second catalyst bed 28. Each grouping 29a, 29b includes multiple foam catalyst blocks 12a, 12b, respectively. Each catalyst block 12 includes a porous ceramic foam material that supports a catalyst component. The catalyst component preferably has an inorganic oxide carrier and at least one catalytic metal selected from the group consisting of vanadium, molybdenum, tungsten and combinations thereof. The preferred carrier is titania.

The porous ceramic foam material has a cellular structure having a ceramic material containing a large volume fraction of gas-filled pores. The porous ceramic foam preferably is an open cell foam having a major portion of the cells open in that they are not totally enclosed by their cell walls, and the cells are interconnected with other cells forming a network. The porosity of the porous ceramic foam material is very high porosity. For example, the porosity of the foam is such that the void space is more than 60%. In one embodiment, the void space of the porous ceramic foam material is at least 75% upwardly to 95%. In particular, the void space of the porous ceramic foam is from 80% to 90%. Void space is defined as the volume of the structure that is open space divided by the total volume of the structure (openings and ceramic) multiplied by 100.

The ceramic foam may include any ceramic material that has sufficient strength and is a suitable carrier for the NOx reduction catalyst such as, for example, cordierite, titanium oxide, alumina, silica, zirconia, or mixtures thereof. The tortuosity of the ceramic foam is preferably greater than 1.0, more preferably greater than 1.5 and most preferably greater than 2.0. Tortuosity may be calculated as the ratio of the length of the flow path taken by the gas through the ceramic foam divided by the length of the shortest straight line path from the inlet to the outlet of the ceramic foam. A straight channel path has a tortuosity of 1.0.

The ceramic foam used herein has from about 5 pores per inch (ppi) to about 50 ppi, preferably from about 10 ppi to 40 ppi. More preferably, the ceramic foam has from 10 ppi to 30 ppi. The pores per inch of the foam impacts the ability of gas to flow through the foam. The cell size of the foam increases as the number of pores per inch decreases, and the cell size of the foam becomes smaller as the number of pores per inch increases. The larger cell structure allows for greater gas flow than the smaller cell structure. It is most preferred to have fewer pores per inch in order to allow for greater gas flow through the ceramic foam. The pore per inch is limited by the structural integrity of the foam.

Each foam catalyst block 12 is rectangular and bounded by six sides, including the front face 15 with an opposing back face 30, the top side 18 with the opposing bottom side 19, and the side face 16a and an opposing side face 16b. The foam catalyst blocks 12 in the catalyst module 10 are each defined by its width, height, and depth (thickness). The depth or thickness of the catalyst blocks 12 is relatively small in comparison to their width and height. Typically, the catalyst blocks 12 will have a depth relative to either the width or height of the catalyst block 12 in the range of from 0.05:1 to 0.4:1 preferably, from 0.08:1 to 0.3:1, and, most preferably, from 0.12:1 to 0.27:1. As should be appreciated, the foam catalyst blocks 12 may have any other geometric shape such as square, triangular, polygonal, or any other suitable shape Multiple catalyst blocks 12 may be arranged together in rows and columns to form a single layer of catalyst blocks 12 that serves as a single foam catalyst block component that makes up the grouping 26. The foam catalyst block component of the grouping 26 may further include two or more single layers of catalyst blocks 12 stacked together in a parallel orientation to each other. The stacked catalyst blocks 12 may also serve as a single foam catalyst block component of the grouping 26 that make up the catalyst module 10. The groupings 26 may have 1, 2, 3, 4, 5, or more rows and columns of the foam catalyst blocks 12. The grouping 26a is in a spaced-apart relationship to the grouping 26b. Each grouping 26a, 26b includes a plurality of catalyst blocks 12 arranged in a side-by-side stacked relationship.

The width, height and depth of the foam catalyst blocks 12 define their boundaries. Thus, each foam catalyst block 12 is bounded by the front face 15 (i.e., inlet side) having a surface area with the opposing back face 30 (i.e., outlet side), the top side 18 with an opposing bottom side 19, and the side face 16a with an opposing alternate side face 16b. As described above, the catalyst module 10 includes two foam catalyst block groupings 26a, 26b with the back face 30 of the catalyst blocks 12 in each respective grouping 26a, 26b facing one another in a spaced relationship. The sealing frame 32, maintains the spaced relationship between the groupings 26a, 26b and provides for forming the sealed volume.

One of the significant elements of the catalyst bed module 10 is its sealing frame 32 located between each pair of groupings 26, 29. For example, turning now to FIG. 2, the sealing frame 32 maintains a spaced relationship between the outlet side (i.e., back face 30 side) of the catalyst blocks 12 of each respective grouping 26a, 26b and 29a, 29b to provide an open space 54. The sealing frame 32 not only maintains the catalysts blocks 12 in each pair of groupings 26, 29 spaced apart, it also seals the open space 54 to provide a gas-tight sealed volume 56 that is defined by the back face 30 of the catalyst blocks 12 in each respective grouping 26, 29 and the sealing frame 32. As used herein, the phrase "gas-tight seal" denotes a seal that does not allow the NOx-containing gas to exit the catalyst blocks and/or the open space prematurely. The sealing frame 32 covers three sides of the open space 54 and leaves the opening 24 unsealed/uncovered such that a treated gas stream (e.g., a gas stream having undergone deNOx) may exit the sealed volume 56 through the opening 24 of the support 22. As discussed above, the catalyst blocks 12 are operatively secured to the support surface 20. For example, the opening 24 is operatively connected to or incorporated into the support surface 20 in a manner that aligns the opening 24 with the open space 54 to provide for passage and release of the treated gas stream from sealed volume 56 to an external destination.

An advantageous aspect of the disclosed catalyst bed module 10 is that five of the six sides of catalyst blocks 12 on the periphery of the catalyst bed module 10 are substantially open and uncovered so that they are exposed to gas flow into the foam catalyst blocks 12 at these locations. That is, the front face 15, the back face 30, the sides 16, the top side 18, and the bottom side 19 are open or otherwise uncovered and unsealed The NOx-containing gas stream 38 flows into each foam catalyst block 12 and passes through the depth of the ceramic foam where it contacts the catalyst supported on the ceramic foam. The resulting treated gas passes from the foam catalyst blocks 12 through each front face 15 (i.e., inlet side) into the sealed volume 56 between the pair of groupings 26, 29.

Thus, the top side 18 of each respective catalyst block 12a, 12b is substantially open and uncovered to permit flow of the NOx-containing gas stream 38 into the top side 18 of the foam catalyst blocks 12. This is the case, as well, for: the side face 16a, 16a' and the alternate side face 16b, 16b'; the front face 15a, 15b and the bottom side 19a, 19b. The boundaries of the foam catalyst blocks 12 at these locations are substantially open and uncovered to permit gas in-flow. That is, the NOx-containing gas stream 38 may flow into the catalyst blocks 12 at any location along the length and width of the side face 16, front face 15, and top side 18. The back face 30, or outlet side, of the catalyst blocks 12 are not open to receive gas inflow. As discussed above, treated gas 60 exits the catalyst blocks 12 through the back faces 30 and discharges into the sealed volume 56 from which if flows through the sealed volume towards the opening 24.

This open construction of the catalyst bed module 10 is significantly less costly to manufacture than the existing sealed catalyst bed modules. Moreover, as noted herein, the disclosed catalyst bed module 10 along with use of the foam catalyst blocks 12, provides for enhanced NOx removal when it is used in combination with the reactor 50 for deNOx process applications. Even with its open design, the reactor systems that utilize the disclosed catalyst bed module 10 provide for substantially lateral flow of gas through reactor.

One feature of catalyst bed module 10 that contributes to its enhanced performance are structural aspects of sealing frame 32. As discussed above, the sealing frame 32 functions by keeping the foam catalyst blocks 12 in each respective pair of groupings 26, 29 in a spaced-apart relationship, and it seals the open space 54 in a gas-tight manner by forming gas-tight seals along the external peripheries of the back face 30 (outlet side) of the respective catalyst blocks 12. The sealing frame 32 further functions by providing for bypassing gas and for directing the gas in-flow at the open sides (e.g., the top side 18, sides 16, and front face 15) of the foam catalyst blocks 12 into and through a distance or length of the foam catalyst blocks 12. This blocks the entering NOx-containing gas stream 38 from passing directly into the sealed volume 56 and, thereby, avoiding contact with the catalyst of the ceramic foam blocks. The sealing frame 32, thus, additionally functions by directing the NOx-containing gas stream 38 entering the sides 16 of the catalyst blocks 12 on the periphery of the catalyst bed 25, 28 to travel a distance 62 into the blocks 12 and to contact with its catalyst component for a long enough period to induce the required reactions.

The sealing frame 32 may have a grid-like pattern similar to the support frame 14 and includes cross element 64 and extended rim bypass elements 68, or flanges. The foam catalyst blocks 12 within each respective grouping 26, 29 are sandwiched between the support frame 14 and the sealing frame 32. FIG. 2 shows the sealing frame 32 as having a channel-like shape that includes the cross element 64, having width 70 measured from end-to-end, and the extended rim bypass elements 68 that extend for length 72, measured from an outside surface of the cross element 64 to an end of the extended rim bypass element 68 outwardly from and orthogonal to each end of the cross element 64. That is, the extended rim bypass elements 68 each extend outwardly from and orthogonal to opposite ends of the cross element 64. In this embodiment, the sealing frame 32 may have a shape similar to that of a structural channel or a C-channel or a parallel flange channel. The channel shape includes the cross element 64 and the two extended rim bypass elements 68, each extending outwardly from a respective end of the cross element 64. The extended rim bypass elements 68 press against the external peripheries of the respective back faces 30 the catalyst blocks 12 on the periphery of the catalyst beds 29. Outer surfaces of the extended rim bypass elements 68 are preferably flat so that when they are pressed against the external periphery of a portion of the back faces 30 of respective foam catalyst blocks 12 on the periphery of the catalyst bed 28 they facilitate a gas-tight seal.

The cross element 64 provides for and supports enclosing the space between the two facing foam catalyst blocks 12 in each respective grouping 29 to provide the sealed volume, and it maintains a spaced relationship between the pair of groupings 29. Typically, the gas-tight seal is provided by mechanical sealing means for joining in a gas-tight manner the mated surfaces of the extended rim bypass elements 68 and the external periphery of the portion of the back faces 30 of the respective catalyst blocks 12 on the periphery of the catalyst bed 28. The mechanical sealing means can be selected from any suitable type of mechanical seal such as a gasket, an adhesive sealant, or any other suitable type of seal.

The external peripheries of back faces 30 are defined by the surface area of each back face 30 that is covered by the flat surfaces of extended rim bypass elements 68 pressed against the back faces 30 of the foam catalyst blocks 12. The extended rim bypass element 68 forms a gas-tight mechanical seal along the external periphery of back face 30 of the catalyst blocks 12a, 12b located on the periphery of the catalyst bed 28. The external periphery covers from 1 to 40% of the total surface area of each back face 30 of the respective grouping 29a, 29b of the catalyst bed 28.

Shown further in FIG. 2 is a partial view of a portion of the first catalyst bed 25. The grouping 26 of foam catalyst blocks 12 of the first catalyst bed 25 are placed on the support surface 20 in a similar manner by which the grouping 29 of the foam catalyst blocks 12 are affixed to support surface 20. The additional grouping 26 of the foam catalyst blocks 12 reside in a spaced and side-by-side stacked relationship with the grouping 29 of foam catalyst blocks 12 to provide open volume 74.

The open volume 74 is defined by the front face 15 (i.e., inlet side) of the foam catalyst block 12 of the grouping 26 adjacent to the foam catalyst blocks 12b of the grouping 29b, the support surface 20, and the front face 16b of the foam catalyst blocks 12b of the grouping 29b. The grouping 26 of the foam catalyst blocks 12 also reside in a spaced and side-by-side stacked relationship to a respective grouping (e.g., grouping 26b) of foam catalyst blocks 12 of the catalyst module 10. The open volume 74 is open to receiving the flow of the NOx-containing gas stream 38. When the reactor 50 is in operation, the open volume 74 fills with the NOx-containing gas stream 38 which passes from the open volume 74 into the front face 15 and the bottom side 19 of each respective foam catalyst blocks 12 in the grouping 26, 29 of the catalyst module 10.

As shown, in the illustrated embodiment, the NOx-containing gas stream 38 flows into the five faces or sides (e.g., the front face 15, the side face 16, the top side 18 and the bottom side 19) of each foam catalyst block 12 in the grouping 26, 29 located on the periphery of the catalyst bed module 10. The sealing frame 32 blocks the direct gas flow into each back face 30 of the foam catalyst blocks 12 in the respective groupings 26, 29 and into sealed volume 54. Instead, the sealing frame 32 directs the flow of the NOx-containing gas stream 38 through the front face 15, the top side 18, the bottom side 19 and the sides 16 of the foam catalyst blocks 12 so that NOx-containing gas stream 38 flows substantially laterally across the depth of each foam catalyst block 12 and exits through the back faces 30 of each foam catalyst block 12 in the respective grouping 26, 29 that is not sealed at the external periphery by the sealing frame 32.

A feature of the disclosed catalyst module 10 that is not found in existing catalyst modules is that the top (top face 18), bottom (bottom side 19) and side (side face 16) ends of the foam catalyst blocks 12 are not sealed to preclude the inflow of the NOx-containing gas stream 38 as is typically the case in existing catalyst modules. The top, bottom and two side ends are substantially open and uncovered such that they permit gas flow into each of the foam catalyst blocks 12 through the top, bottom and side ends in addition to the faces 15, 30. As is typical for existing catalyst modules, the front face (i.e., inlet side) of the foam catalyst blocks is substantially open and uncovered to permit gas flow into the foam catalyst block, while the top side, bottom side and sides are covered or sealed. By covering the top side, bottom side and sides of the foam catalyst block, gas flows only into the front face and exists the back face. The flow of gas into the front face of the foam catalyst blocks is the flow direction of the gas that provides for the lateral gas flow. The gas flows into the foam catalyst blocks at the front face, passes laterally through the depth of the foam catalyst block and exits the back face (i.e., outlet side) of the foam catalyst block into the sealed volume. The resulting treated gas then flows from the sealed volume through the bottom-side opening and support surface opening, and then away from the catalyst module and exits the LFR.

Figure 3:
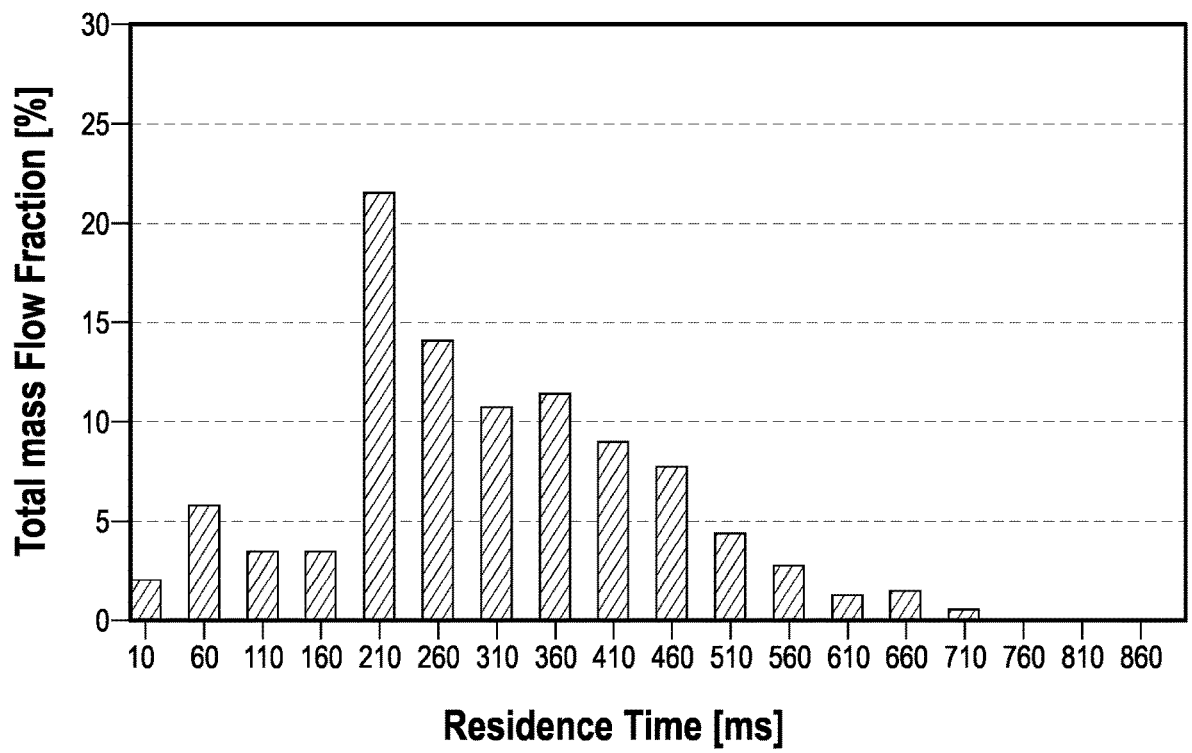
FIG. 3 is a plot of % total mass gas flow fraction as a function of residence time in milliseconds (ms) of a model predicted gas flow through a catalyst bed having catalyst foam blocks and a sealing frame without extended rim bypass elements.
Figure 4:
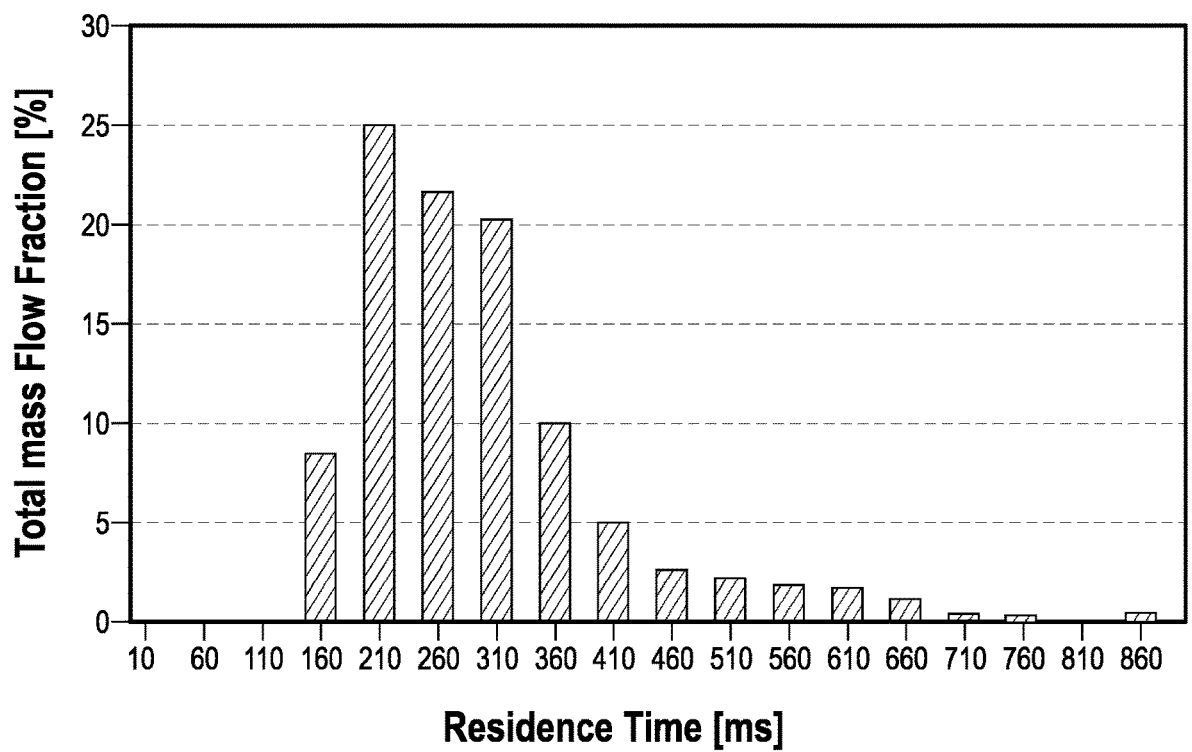
FIG. 4 is a plot of % total mass gas flow fraction as a function of residence time in milliseconds (ms) of a model predicted gas flow through the catalyst bed module of FIG. 1.

It has been found that allowing a NOx-containing gas 38 to enter into the sealed volume between two groupings 26, 28 of the catalyst blocks 12 directly through the open top, bottom and side ends of the catalyst blocks 12 without the disclosed sealing frame 32 results in the NOx-containing gas 38 to not sufficiently contact the catalyst to provide good NOx conversion. This is because much of the gas that enters at these locations fails to penetrate deep enough into the catalyst blocks to provide sufficient contact time with its catalyst to promote the necessary NOx conversion. What happens is that the gas flows into the top, bottom and side surfaces and then passes directly into the volume defined by the space between the two catalyst blocks without penetrating any significant depth of the catalyst blocks. For example, FIG. 3 is plot 75 of % total mass flow fraction vs dwell (residence) time illustrating model predicted data for gas flow through a catalyst bed having foam catalyst blocks with unsealed/uncovered front, top, bottom, and lateral sides (e.g., the foam catalyst blocks 12) and a sealing frame that does not include extended rim bypass elements (e.g., the extended rim bypass elements 68). As shown in the illustrated plot 75, approximately 15% of the total mass flow has a residence time that is at or below 110 milliseconds (ms), which indicates a partial bypass. In contrast, model predicted data for the gas flow through a catalyst bed having the foam catalyst blocks with unsealed/uncovered front, top, bottom, and lateral sides (e.g., the foam catalyst blocks 12) and a sealing frame (e.g., the sealing frame 32) having the extended rim bypass elements (e.g., the extended rim bypass elements 68) has a residence time at above 160 ms, as shown by the plot 76 of FIG. 4.

The structural design of the disclosed catalyst module 10 solves the problems caused by using open and unsealed tops, bottoms and side ends of the catalyst blocks. It does this with the use of the sealing frame 32 having the cross element 64 and the extended rim bypass elements 68. The sealing frame 32 solves the problem by providing a gas-tight seal around the external periphery of the back faces 30 (i.e., outlet side) of the foam catalyst blocks 12 positioned on the outermost portion of the groupings 26, 28 and blocking the NOx-containing gas 38 from bypassing and prematurely exiting the foam catalyst blocks 12 on the periphery of the catalyst bed module 10.

The external periphery of the back face 30 of the catalyst block 12 on the outermost perimeter of the catalyst beds 25, 28 is defined by the amount of surface area of the back face 30 that is covered and sealed by the extended rim bypass elements 64 of the sealing frame 32. The surface area coverage of the external periphery of the back faces 30 of the foam catalyst blocks 12 is determined and adjusted by setting the length of the extended rim bypass elements. The coverage of the external periphery by the extended rim bypass should be at least 1% of the total surface area of the back face 30 of the foam catalyst blocks 12 and less than 40% of the total surface area. Preferably, the external periphery covered by the extended rim bypass elements is in the range of from 5% to 30% of the surface area of the foam catalyst block. Most preferably, the covered external periphery is in the range of from 10% to 20% of the surface area of the foam catalyst block 12.

The extended rim bypass elements 68 function so that the NOx-containing gas 38 that flows directly into and through the open top side 18, the bottom side 19 and side ends 16 of the foam catalyst blocks 12 of the catalyst module 10 penetrate and pass through a length of the foam catalyst blocks 12 before bypassing the extended rim bypass elements 68 and entering the sealed volume 54 between the foam catalyst blocks 12. This causes the NOx-containing gas 38 to contact the catalyst of the foam catalyst blocks 12 for sufficient amounts of distance and time to allow for the reaction conversion of the NOx compounds contained in the gas flow. It is unexpected that this configuration results in enhanced NOx conversion over a catalyst module in which the top, bottom and side ends of the foam catalyst blocks are fully sealed or unsealed without the sealing frame 32 disclosed herein.

Figure 5:
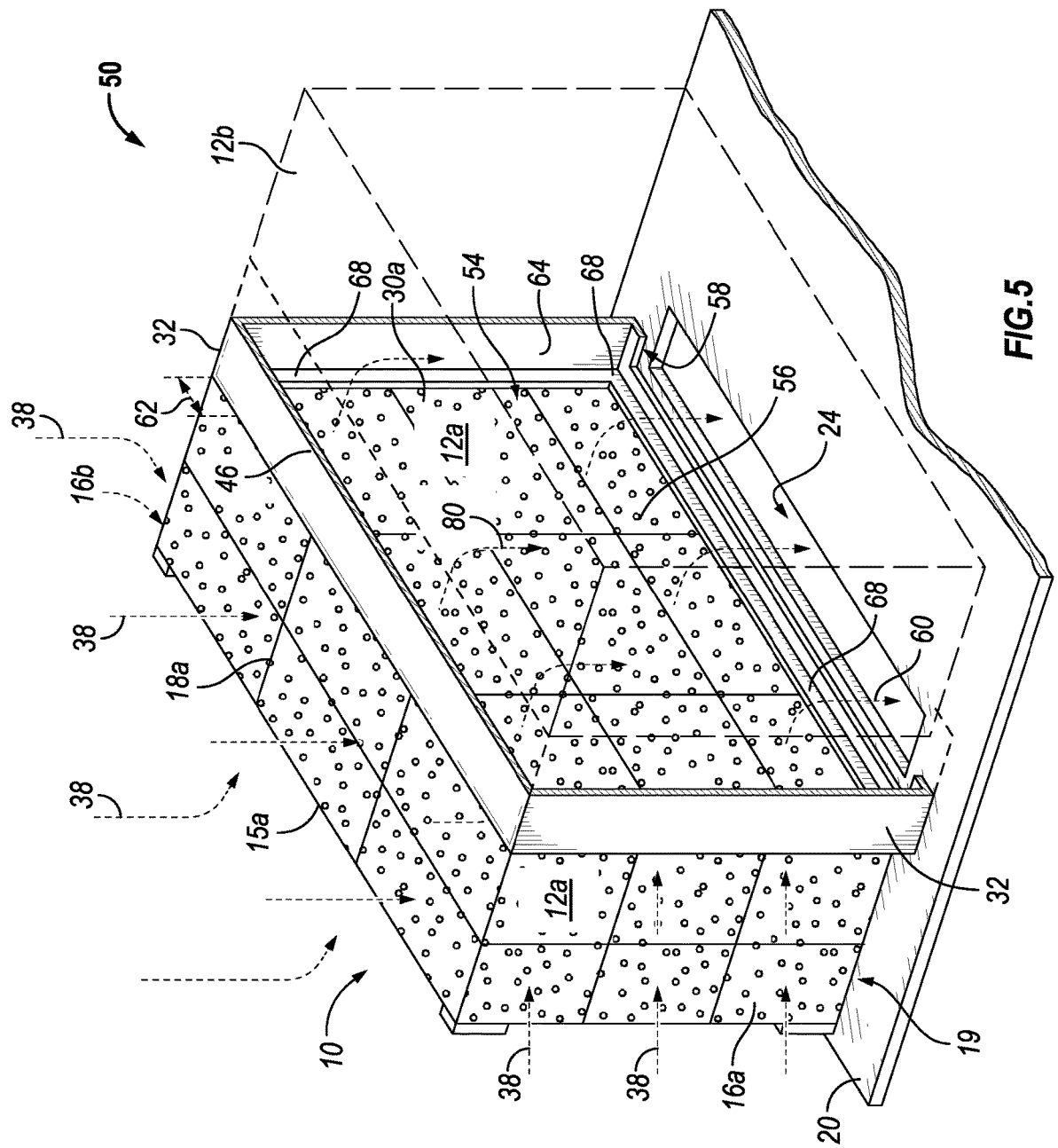
FIG. 5 is a perspective sectional view of the lateral flow reactor of FIG. 2 that is cut along the shown vertical section line 5-5 in FIG. 2, the sealing frame includes a cross element and extended bypass rim elements, in accordance with an embodiment of the present disclosure.

FIG. 5 is a perspective view of a section of the reactor 50 shown in FIG. 2. FIG. 5 shows the portion of the reactor 50 of FIG. 2 that is sectioned off along the vertical cut line 5-5. FIG. 5 separates off the foam catalyst block 12b and sections the sealing frame 32 so that it exposes structural features within the open space 54 of the sealed volume 56. Shown further is the back face 30a of the foam catalyst block 12a. The sealing frame 32 includes the cross element 64 (not shown) and extended rim bypass elements 68 that are pressed against the external periphery of the back face 30a. Treated gas flows out from the back face 30a into the open space 54, as shown by arrows 60, which makes up the sealed volume 56 formed by the sealing frame 32, the seal formed with support surface 20, and the back faces 30a of the foam catalyst block 12a and those of the foam catalyst block 12b. The treated gas 60 flows from the sealed volume 56 through the opening 24 of support surface 20.

Figure 6:
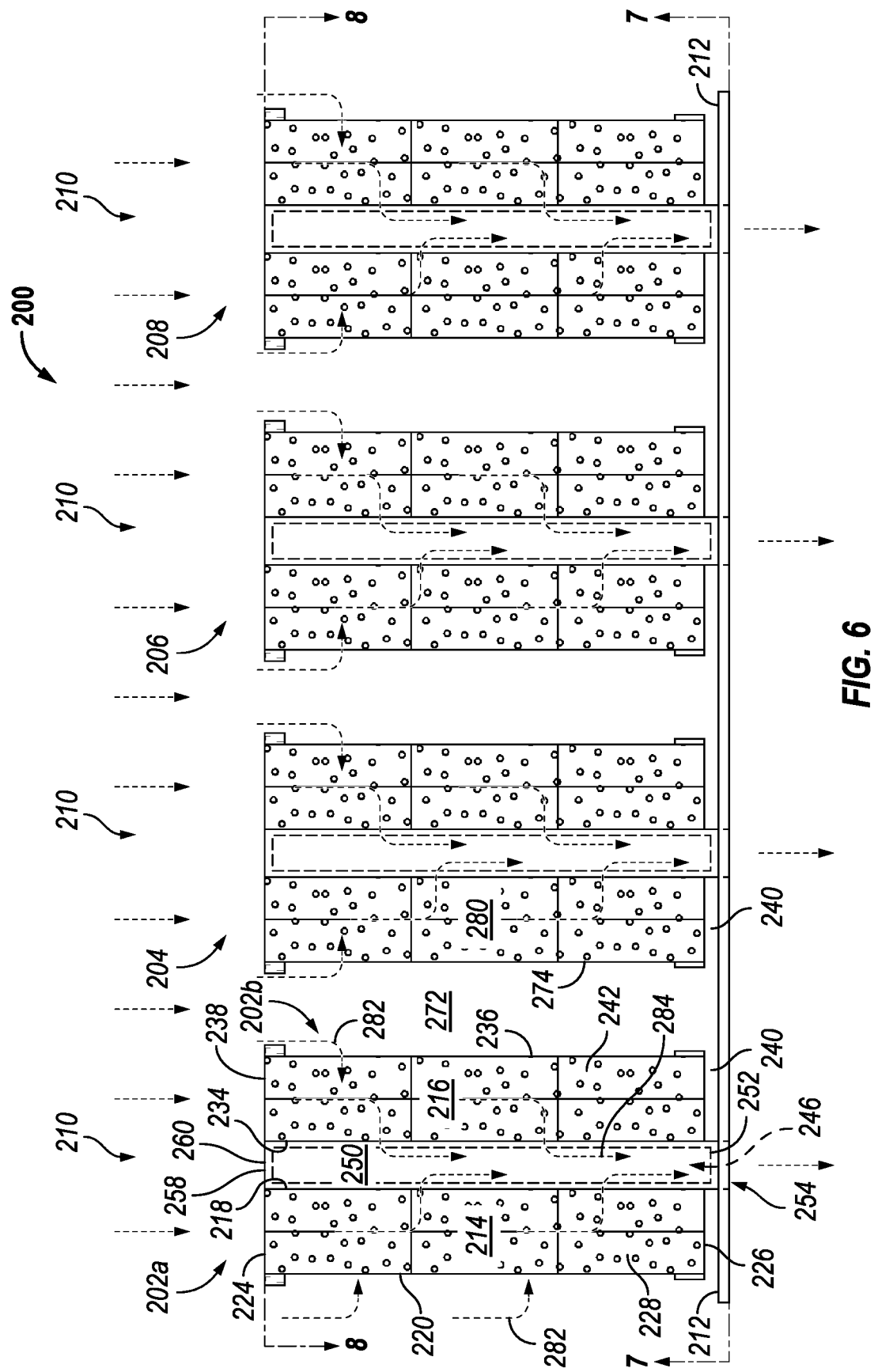
FIG. 6 is a side elevation view of a lateral flow reactor having the catalyst bed module of FIG. 1, in accordance with an embodiment of the present disclosure.

FIG. 6 is a side elevation view of an embodiment of an LFR reactor 200 having multiple catalyst bed modules 10 in accordance with an embodiment of the present disclosure. The LFR reactor 200 includes four groupings 202, 204, 206, 208 of foam catalyst blocks 210 that make up a portion of the LFR reactor 200. Each grouping 202, 204, 206, 208 of foam catalyst blocks 210 is oriented and operatively secured to support surface 212 in a side-by-side stacked relationship. Also, each grouping 202, 204, 206, 208 of foam catalyst blocks 210 provides the same function and has substantially the same structure as the other groupings of foam catalyst blocks 210. So, the description herein to one of the groupings 202, 204, 206, 208 of foam catalyst blocks 210 applies as well to each of the other groupings of foam catalyst blocks 210. Therefore, to facilitate discussion of FIG. 6, reference will only be made to the grouping 202.

The grouping 202 of foam catalyst blocks 210 includes a first foam catalyst block 214 and second foam catalyst block 216. Each foam catalyst block 214, 216 is rectangular and bounded by six sides. The foam catalyst blocks 214, 216 are arranged spaced-apart and parallel to the other. However, in other embodiments, the foam catalyst blocks 214, 216 may be slanted relative to one another rather than parallel.

The first foam catalyst block 214 includes a first back face 218 (outlet side) with an opposing first front face 220 (inlet side), a first top side 224 with opposing first bottom side 226, and a first side face 228 and opposing first alternate side face (not shown). Located in a spaced-apart relationship to the first foam catalyst block 214 is the second foam catalyst block 216. The second foam catalyst block 216 includes a second back face 234 (outlet side) with an opposing second front face 236 (inlet side), a second top side 238 with opposing second bottom side 240, and a second side face 242 and opposing second alternate side face (not shown).

The side elevation view of FIG. 6 depicts the first side face 228 and the second side face 242 as facing the viewer with the opposing first alternate side face and the second alternate side face shown opposite the side faces 228, 242 and out of view. Five of the six sides of each foam catalyst block 214, 216 are shown substantially open and uncovered so that they are exposed to gas flow into the foam catalyst blocks 214, 216 at these locations.

A sealing frame 246 resides between the first foam catalyst block 214 and the second foam catalyst block 216 to maintain a spaced relationship between the foam catalyst blocks 214, 216 by keeping them spaced apart. The sealing frame 246 also functions by sealing the open space between the foam catalyst blocks 214, 216 to provide a gas-tight sealed volume 250 that is defined by the first back face 218, the second back face 234, and the sealing frame 246. The sealing frame 246 covers three sides of the open space between the foam catalyst blocks 214, 216 and leaves the bottom-side opening 252 that is capable of providing for passage of gas flow away from the sealed volume 250.

The first foam catalyst block 214 and the second foam catalyst block 216 are operatively secured to the support surface 212 that defines and includes an opening 254. The bottom-side opening 252 is operatively connected to or incorporated into the support surface 212 in a manner that aligns the bottom-side opening 252 with the opening 254 to provide for passage of gas flow from the sealed volume 250 to an external destination. The opening 254, thus, is configured with the bottom-side opening 252 to provide for the capability of passage of gas flow from the sealed volume 250 through the bottom-side opening 252 and the opening 254 to an external destination.

The sealing frame 246 maintains the spaced-apart relationship between the first foam catalyst block 214 and the second foam block 216. The sealing frame 246 further provides for sealing the open space defined by the two foam catalyst blocks 214, 216 in a gas-tight manner by forming gas-tight seals along the external peripheries of the first back face 218 and the second back face 234. The sealing frame 246 also provides for directing the gas in-flow at the open sides of the first foam catalyst block 214 and the second foam catalyst block 216 into and through a distance or length of the foam catalyst blocks 214, 216. This prevents the entering gas from passing directly into the sealed volume 250 and thereby avoiding contact with the catalyst of the ceramic foam blocks. The sealing frame 246 provides for directing the gas entering the sides of the ceramic foam blocks to travel a distance into the ceramic foam blocks so that the gas contacts the catalyst components for a long enough period to induce the required reactions.

The sealing frame 246 includes a cross element 258 and an extended rim bypass elements 260. The sealing frame 246 has a channel-like shape that includes the cross element 258 and the extended rim bypass elements 260 that extend outwardly from each end of the cross element 258. The extended rim bypass elements 260 press against the external peripheries of the first back face 218 and the second back face 234.

The external peripheries of the first back face 218 and the second back face 234 are defined by the surface area of each back face 218, 234 that is covered by the flat surfaces of the extended rim bypass elements 260 pressed against the back faces 218, 234 of the foam catalyst blocks 214, 216. The extended rim bypass 260 forms a first gas-tight mechanical seal along a first external periphery of the first back face 218, and it forms a second gas-tight mechanical seal along a second external periphery of the second back face 234. The first external periphery covers from 1 to 40% of the total surface area of the first back face 218, and the second external periphery covers from 1 to 40% of the total surface area of the second back face 234.

Each grouping 202a of foam catalyst blocks 210 is placed onto and affixed to the support surface 212 in a similar manner to the other groupings 202b in a spaced and stacked lateral relationship. The additional groupings 204, 206, 208 of the foam catalyst blocks 210 resides in a spaced and side-by-side stacked relationship to the groupings of foam catalyst blocks 210 to provide open volume 272.

The open volume 272 is defined by the second front face 236 of the second foam catalyst block 216, the support surface 212, and the first front face 274 of a foam catalyst block 280 of the adjacent grouping 204 of foam catalyst blocks 210. The open volume 272 is open to receiving gas flow. When the LFR reactor 200 is in operation, the open volume 272 fills with gas 282 that passes from the open volume 272 into the second front face 236 and the second bottom side 240 of the grouping 202 of the foam catalyst blocks 210 and the second front face 274 and the second bottom side 240 of the adjacent grouping 204 of the foam catalyst blocks 210.

The dashed arrow lines of FIG. 6 are representative of the flow of the gas 282 into the foam catalyst blocks 214, 216 of LFR reactor 200. As shown, gas 282 flows into the five faces or sides (e.g., the front faces 220, 236, 274, the bottom side 240, side faces 228, 242, the opposing side faces and the top side 224, 238) of each foam catalyst block 214, 216. The sealing frame 246 prevents the direct gas flow (e.g., the gas 282) into each back face 218, 234 of the foam catalyst blocks 210 and into the sealed volume 250. Instead, the sealing frame 246 directs the flow of the gas 282 through the front, top, bottom and sides of the foam catalyst blocks 210 so that gas 282 flows substantially laterally across the depth of each foam catalyst block 210 and exits as a treated gas 284 through the back faces 218, 234 of each foam catalyst block 210 that is not sealed at the external periphery by the sealing frame 246. As should be appreciated, while the illustrated embodiment only depicts four groupings 202, 204, 206, 208, the LFR reactor 200 may have more or less than four groupings without departing from the scope of the present disclosure.

Figure 7:
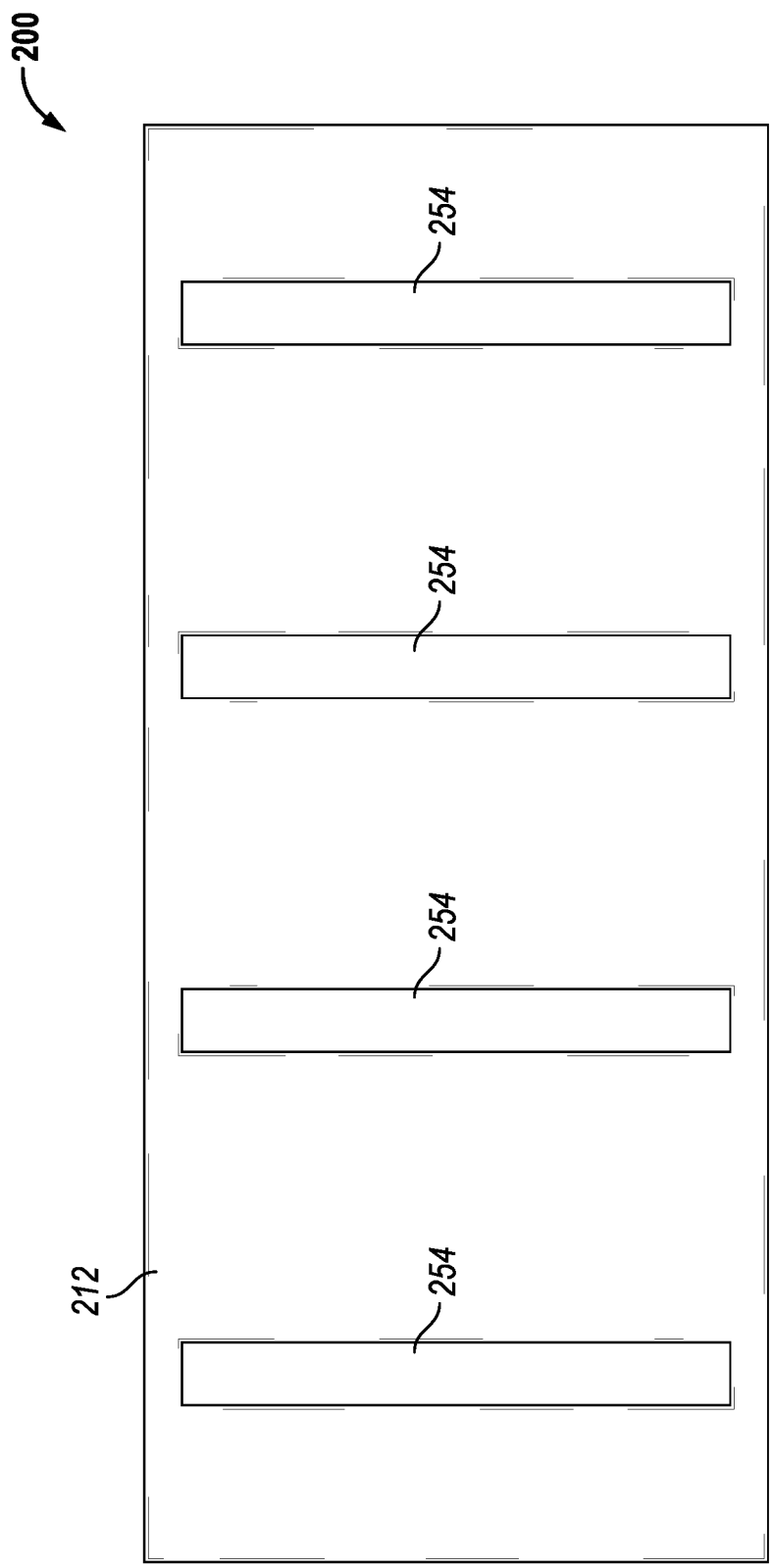
FIG. 7 is a bottom up plan view of a portion of the lateral flow reactor with the plane and direction of sight shown by section line 7-7 in FIG. 6, in accordance with an embodiment of the present disclosure.

FIG. 7 presents a plan view of LFR reactor 200 from the bottom up with the plane and direction of sight shown by section line 7-7 in FIG. 6. Shown is the support surface or plate 212 having defined therein four openings 254 with each providing an aperture through which gas (e.g., the treated gas 284) may pass. The opening 254 is aligned on the opposite side of the support surface 212 with the bottom-side opening 252 to provide for passage of gas flow from the sealed volume 250.

The first foam catalyst block 214 with the first front face 220, the first side face 228, a first alternate side face 230, and the first top side 224. The second foam catalyst block 216 is shown having the second front face 236, the second side face 242, a second alternate side face 244, and the second top side 238. The first back face 218 and the second back face 234 of the foam catalyst blocks 214, 218 face each other with the sealing frame 246 maintaining the two in a spaced apart relationship. Together, the back faces 218, 234 of the two foam catalyst blocks 214, 216, respectively, and the sealing frame 246 define the sealed volume 250.

In the operation of LFR reactor 200, the gas (e.g., the gas 282) flows downward and fills the open volume 272 and the volume surrounding the groupings 202, 204, 206, 208 of foam catalyst blocks 210. The gas passes into the open sides of each foam catalyst block 210 and passes laterally through the depth of the foam catalyst blocks 210 into the sealed volume (e.g., the sealed volume 250) from where the gas exits through the bottom-side opening 252 (hidden) and the opening 254 (hidden) to an external destination. The extended rim bypass elements 260 of the sealing frame 246 supports the lateral flow of the gas through the foam catalyst blocks 210 by directing gas flow through a desired length of the foam catalyst blocks 210.

Figure 8:
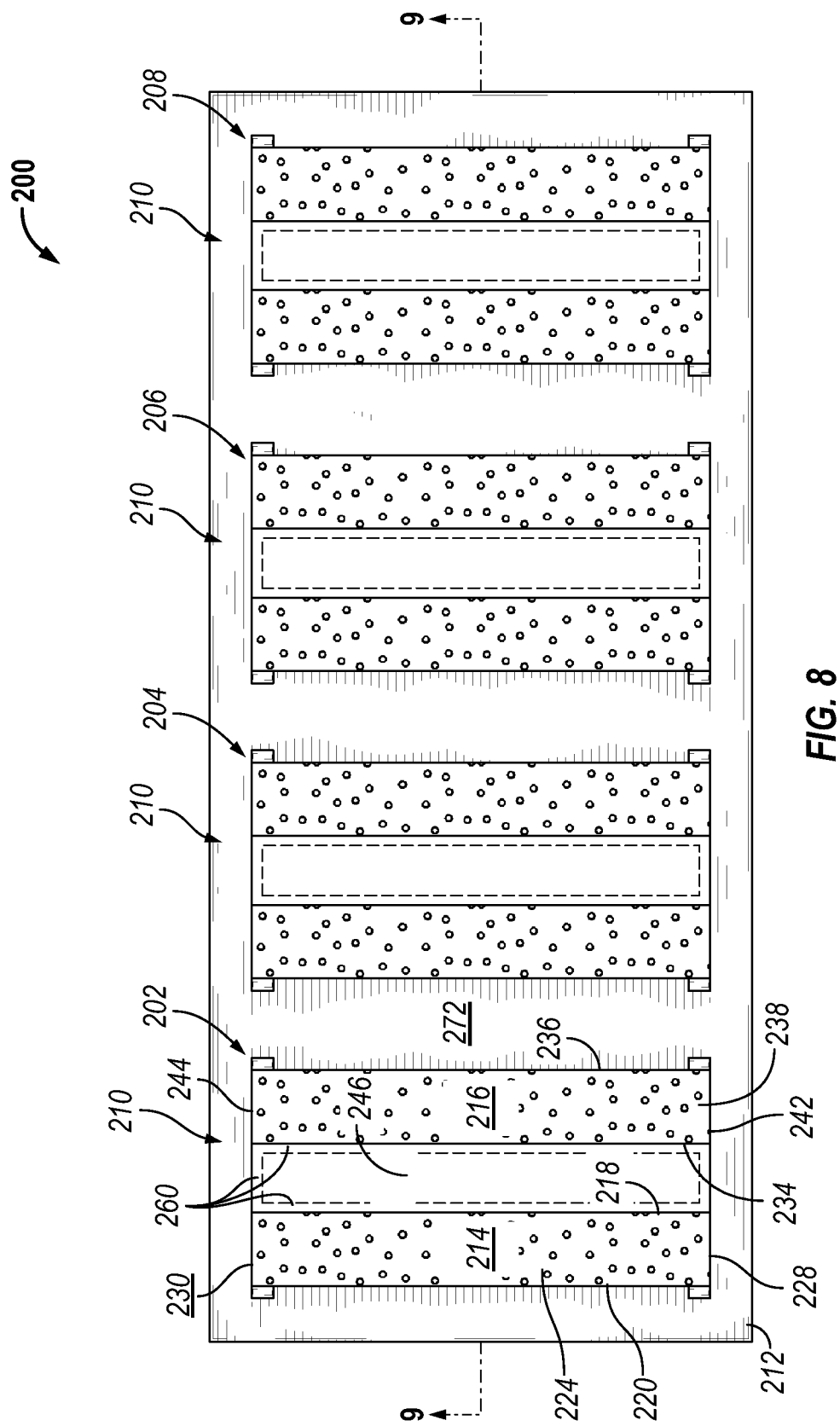
FIG. 8 is a top down plan view of a portion of the lateral flow reactor with the plane and direction of sight shown by section line 8-8 in FIG. 6, in accordance with an embodiment of the present disclosure.

FIG. 8 presents a top down elevation or plan view of LFR module 200 with the plane and direction of sight shown by section line 8-8 in FIG. 7. Shown are the four groupings of foam catalyst blocks 210 that make up the whole of LFR module 200 on support surface 212. Each grouping of foam catalyst blocks 210 includes first foam catalyst block 214 and second foam catalyst block 216. The top ends of each of foam catalyst block 214 and 216 and sealing means 246 face the viewer.

Figure 9:
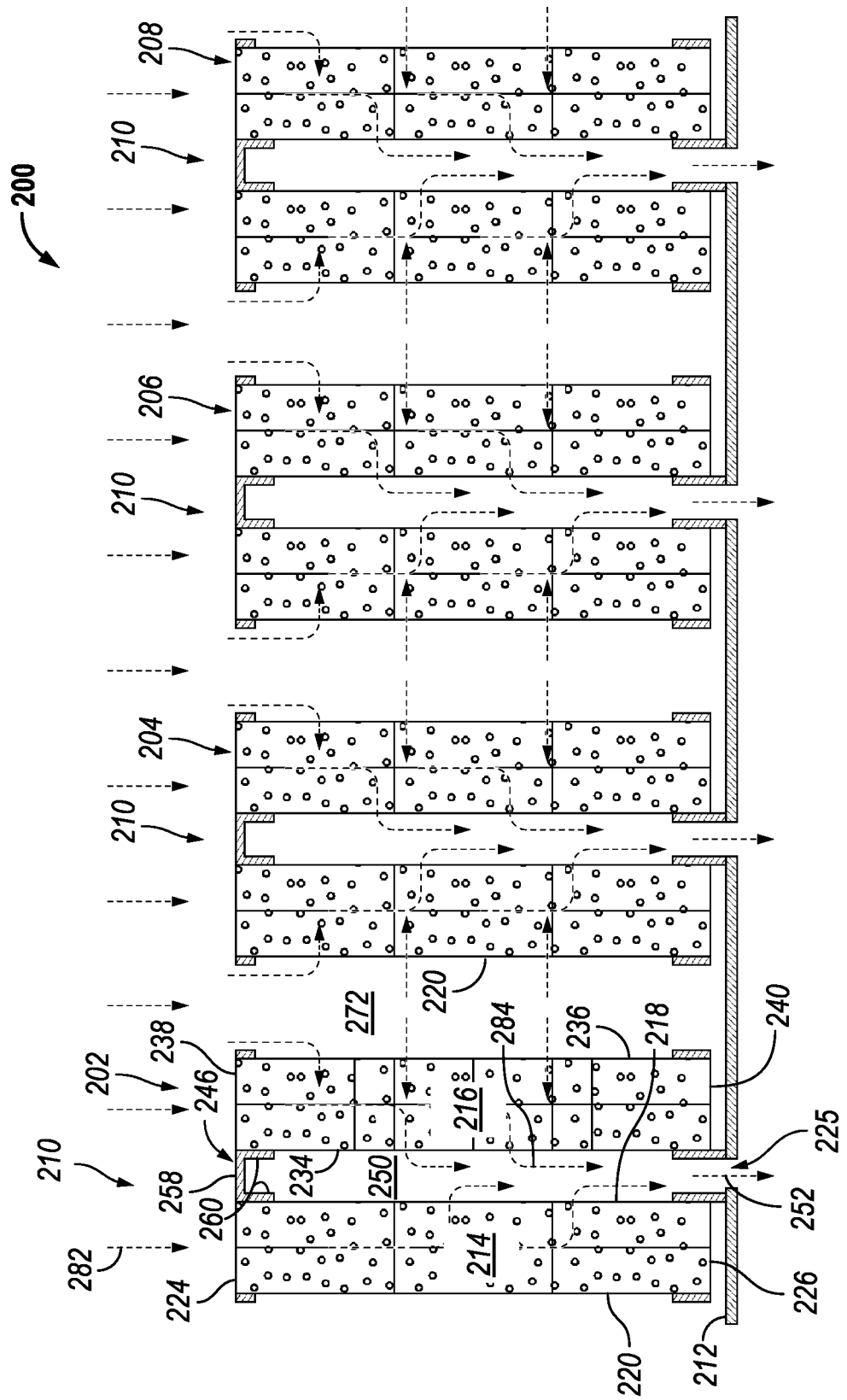
FIG. 9 is a side sectional view of a portion of the lateral flow reactor cut along section line 9-9 in FIG. 8, in accordance with an embodiment of the present disclosure.

FIG. 9 is a side sectional view of a portion of the LFR reactor 200 cut along section line 9-9 in FIG. 8. Shown are sectional views of the four groupings 202, 204, 206, 208 of the foam catalyst blocks 210 of the LFR reactor 200. Each of the groupings 202, 204, 206, 208 of the foam catalyst blocks 210 is secured to the support surface 212 in a side-by-side stacked relationship.

First back face 218 of the first foam catalyst block 214 and the second back face 234 of the second foam catalyst block 216 face each other in a spaced-apart relationship. The sealing frame 246 maintains the spaced relationship and forms a gas-tight seal along the external peripheries of the back faces 218, 234 of the respective foam catalyst blocks 210 to provide the sealed volume 250. The sealed volume 250 includes the open space defined on three sides by the first back face 218, the second back face 234, and the sealing means 246 that together provide the bottom-side opening 252 capable of providing for passage of gas flow (e.g., the treated gas 284) from the sealed volume 250.

The sealing frame 246 has a channel-like shape that includes the cross element 258 and the extended rim bypass elements 260 that extend outwardly from and are orthogonal to each terminal end of the cross element 258. The extended rim bypass elements 260 press against the external peripheries of the first back face 218 and the second back face 234 of the respective foam catalyst blocks 214, 216.

The external peripheries of the first back face 218 and the second back face 234 are defined by the surface area of each respective back face 218, 234 that is covered by the flat surfaces of the extended rim bypass elements 260 that are pressed against the back faces 218, 234 of the foam catalyst blocks 214, 216, respectively. The extended rim bypass element 260 forms a first gas-tight mechanical seal along the external periphery of the first back face 218 and a second gas-tight mechanical seal along the external periphery of the second front face 234. The surface area coverage of the external peripheries of the back faces 218, 234 of the foam catalyst blocks 210 is determined and adjusted by setting the length of the extended rim bypass elements 260 to provide coverage of the external peripheries needed for directing the gas flow.

The sealing frame 246 also provides for directing the gas 282 in-flow at the open sides of the first foam catalyst block 214 and the second foam catalyst block 216 into and through a distance or length of the foam catalyst blocks 214, 216. This blocks the entering gas 282 from passing directly into the sealed volume 250 and thereby avoiding contact with the catalyst of the ceramic foam blocks 214, 216. The sealing frame 246 also provides for directing the gas 282 entering the sides of the ceramic foam blocks 214, 216 to travel a distance into the ceramic foam blocks so that the gas 282 contacts the catalyst components for a long enough period to induce the required reactions.

The extended rim bypass elements 260, thus, function so that gas 282 flows directly into and through the open top (the first top side 224 and the second top side 238), the bottom (the first bottom side 226 and the second bottom side 240) and the side ends (the first side face 228, the first alternate side face 230, the second side face 242, and the second alternate side face 244, shown in FIG. 8) of the respective foam catalyst blocks 214, 216. The extended rim bypass elements 260 cause the gas 282 to penetrate and pass through a length of the foam catalyst blocks 210 before bypassing the extended rim bypass elements 260 and entering the sealed volume 250. This provides for contacting of the gas 282 with the catalyst of the foam catalyst blocks 210 for a sufficient distance and time to allow for the reaction of components contained in the gas flow.

Figure 10A:
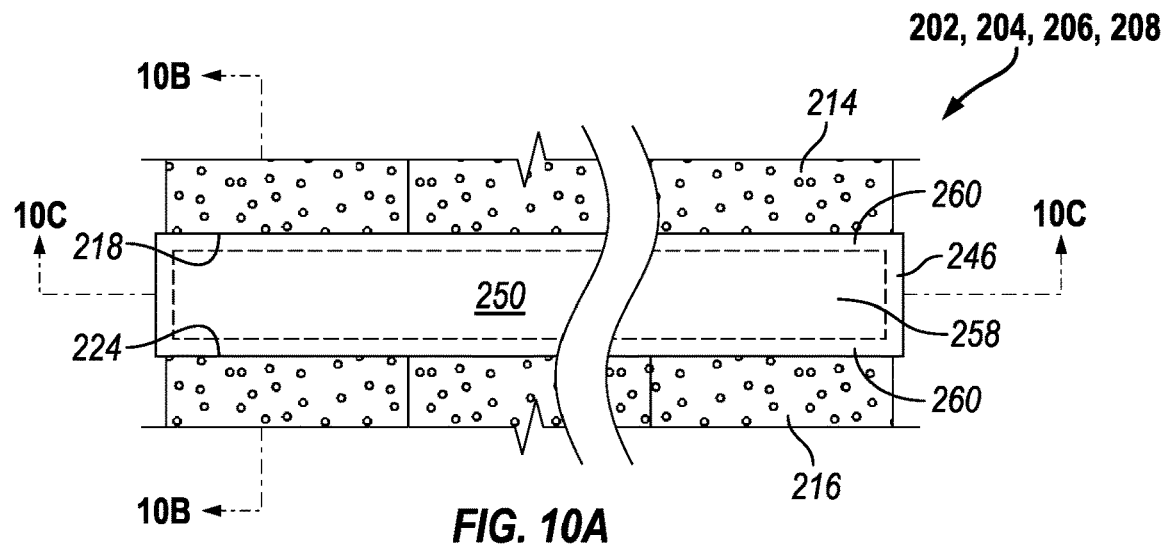
FIG. 10A is a top down detail of a pair of groupings having a plurality of catalyst blocks, whereby the pair of groupings are spaced apart by the sealing frame of the catalyst bed module showing cuts along section lines 10B-10B and 10C-10C of the sealing frame, in accordance with an embodiment of the present disclosure.
Figure 10B:
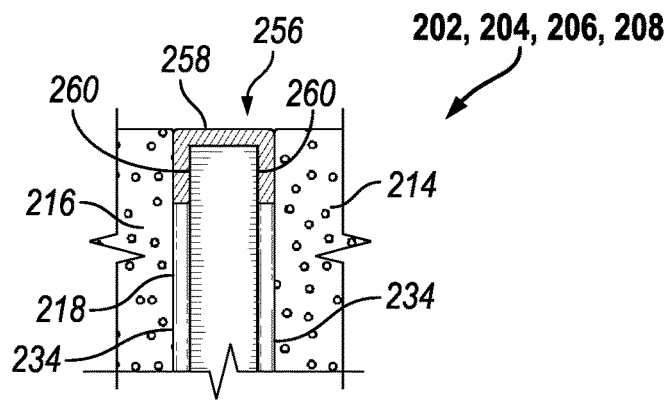
FIG. 10B is a sectional view of a pair of groupings and the sealing frame of FIG. 10A with the plane and direction of sight shown by section line 10B-10B in FIG. 10A.
Figure 10C:
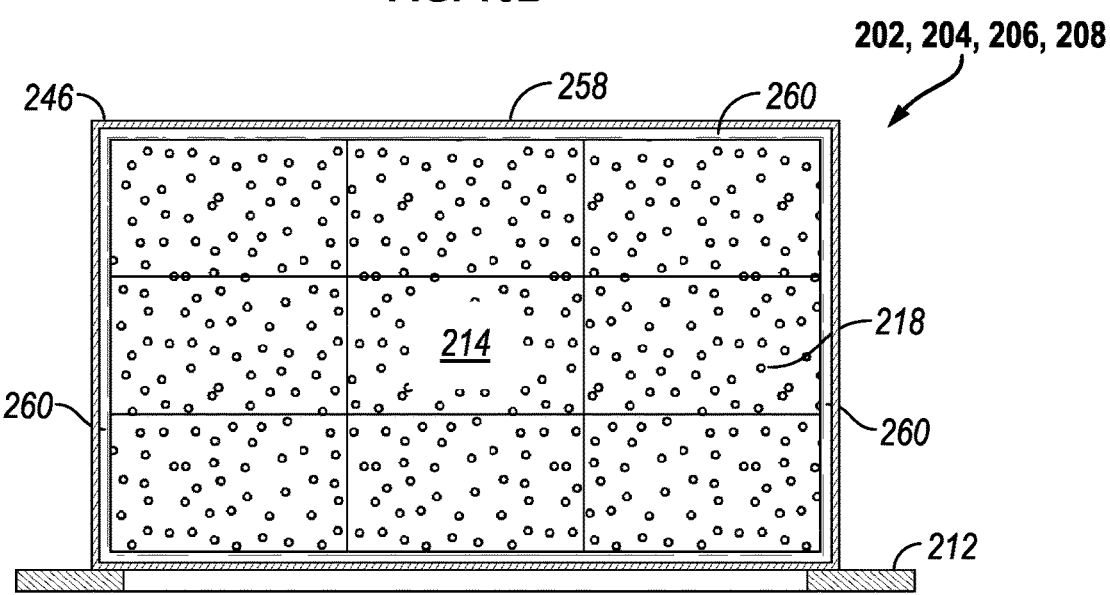
FIG. 10C is a sectional view of the a pair of groupings and the sealing frame of FIG. 10A with the plane and direction of sight shown by section line 10C-10C in FIG. 10A.

FIG. 10A presents a top down detail view of the grouping 202, 204, 206, 208 spaced apart by the sealing frame 246. FIG. 10B presents a sectional view of the grouping 202, 204, 206, 208 with the plane and line of sight shown by the cut along section line 10B-10B. FIG. 10C presents a sectional view of the grouping 202, 204, 206, 208 with the plane and line of sight shown by the cut along section line 10C-10C.

Reference is made to FIG. 10A which shows from a top down plan view the grouping 202, 204, 206, 208 and the sealing frame 246. The broken lines show the below surface cross element 258 and the extended rim bypass elements 260. Also, below the top surface of the sealing frame 246 and sandwiched between the first foam catalyst block 214 and the second foam catalyst block 216 is the sealed volume 250. The first back face 218 of the first foam catalyst block 214 and the second back face 234 of the second foam catalyst block 216 face one another in a spaced relationship that together with the sealing frame 246 form the sealed volume 250.

FIG. 10B is a detail view of section 10B-10B which shows a channel-shaped sealing frame 256 in relationship to the first back face 218 of the first foam catalyst block 214 and the second back face 234 of the second foam catalyst block 216. Further shown is the cross element 258 and the extended rim bypass elements 260 of the sealing frame 256.

FIG. 10C is a detail view of section 10C-10C which shows an elevation view of the grouping 202 cut vertically in the middle to show the sealing frame 246 relationship with the first back face 218 of the first foam catalyst block 214. Shown is the cross element 258 and the extended rim bypass elements 260 of the sealing frame 246. The sealing frame 246 abuts and is coupled to the first foam catalyst block 214 along an outer periphery of the foam catalyst block 14 that form the outermost perimeter of the grouping 202, thereby framing the foam catalyst blocks 214. The extended rim bypass elements 260 press against the external periphery of the first back face 218 to provide a gas-tight seal. Treated gas passed substantially laterally through the first foam catalyst blocks 214 and exits from the first back face 218 into the sealed volume 250.

The following example illustrates the invention and demonstrates its benefits. The example, however, should not limit the scope of the invention.

Preparation of Catalyst Foam Blocks

As discussed above, the catalyst bed module 10 includes groupings 26, 29 of foam catalyst blocks having a catalyst component disposed on and/or within a ceramic foam. The ceramic foam may be made by coating a structure of a polymer foam, such as polyurethane foam, with an aqueous slurry of a ceramic material, such as alumina ($Al_2O_3$) and zirconia ($ZrO_2$), followed by drying and calcining the impregnated foam to leave behind only ceramic material. The calcination is performed in air at a temperature above 1000° C. Typically, the calcination is conducted at a temperature in the range of from 1000° C. to 2000° C. The slurry contains ceramic particles having a diameter in the range of from 0.1 μm to 10 μm and water with appropriate amounts of wetting agents, dispersion stabilizers and viscosity modifiers. The calcination vaporizes or burns the polymer leaving behind the ceramic which sinters.

After the calcination and sintering, the remaining ceramic foam has an interconnected internal tortuous pore structure that also is referred to as a reticulated structure. This structure provides for turbulent flow of gases through the foam and improved contact of the gases with any catalyst that is supported by the ceramic foam when compared to other types of support such as honeycomb channels. It is desirable for the catalyst component to be applied to the ceramic foam as a wash coat of a slurry of particles of a titania carrier and catalytic metal. The most preferred catalyst for application to the ceramic foam is that described in U.S. Pat. No. 6,419,889, which is hereby incorporated by reference herein.

The titania carrier of the catalyst component may be made by mixing titania powder with water and a peptizing agent to form an extrudable paste. The extrudable paste is extruded into extrudates of any suitable shape, such as cylinders and trilobes, that are dried followed by calcination at a temperature below 650° C. and preferably between 350° C. to 600° C. The extrudates are then contacted with one or more metal compounds of a metal selected from the group consisting of vanadium, molybdenum, and tungsten. It is preferred that the extrudates are impregnated with an aqueous solution of the metal compound. After incorporation of the metal into the titania carrier, it is dried and then calcined at a calcination temperature in the range of from 350 to 550° C. for a calcination time period in the range of from 0.5 to 6 hours. The titania support catalyst has a surface area as measured by nitrogen adsorption in the range of from about 50 m$^2$/g to about 150 m$^2$/g. The catalyst may have a bimodal pore distribution with more than 90% of the pore volume present in pores having a diameter of at most about 100 nm, where the pore volume is considered to be the pore volume present in pores having a diameter between about 1 nm an about 100 nm.

As discussed above, the foam catalyst blocks 12 include a catalyst component that is incorporated onto or into the ceramic foam by any suitable impregnation or wash coating method. If the reactor system is to be used in a deNOx application, the catalyst component preferably includes titania that is impregnated with a metal selected from the group consisting of vanadium, molybdenum, tungsten and combinations thereof.

The titania supported catalyst described above may be used to make a slurry that is applied to the ceramic foam as a wash coat. The supported catalyst is grinded or milled to form particles having a diameter in the range of from 0.1 μm to 10 μm. This powder is mixed with water and appropriate amounts of wetting agents, dispersion stabilizers and viscosity modifiers to provide a slurry that is applied as a wash coat to the ceramic foam. The washed coated ceramic foam is then further dried and calcined to generate the foam catalyst block used as a component of the lateral flow reactor module of the reactor system.

EXAMPLE

This Example describes foam catalyst reactor modules designed for the experiment to be representative of a comparison, fully-sealed lateral flow deNOx reactor (comparison reactor) and an open-sided lateral flow deNOx reactor (inventive reactor), in accordance with an embodiment of the present disclosure. The foam catalyst reactor modules were tested for their deNOx performance. A summary of the comparative results from this testing is presented that shows the improvement in deNOx conversion provided by the open-sided reactor design over the fully-sealed reactor design.

The comparison reactor included a square-shaped foam catalyst block having the dimensions 300 mm (W)×300 mm (L)×100 mm (H). The comparison reactor was fully sealed on four sides (e.g., top, bottom, and both lateral sides) and configured to provide for the passage of gaseous feed into the front face of the foam catalyst block and through the depth of the foam catalyst block. Treated gas passed from the foam catalyst block through its back face opposing the front face.

Each foam catalyst block component of the foam catalyst reactor modules was a porous ceramic foam block that was wash-coated with a slurry of vanadium-impregnated titania particles or powder. The vanadium-impregnated titania catalyst was prepared in accordance with the method disclosed in U.S. Pat. No. 6,419,889 and milled into powder used in the preparation of the aqueous slurry for application as a wash coat. The vanadium-impregnated titania contained vanadium in an amount of about 3.2 wt. % of the impregnated titania. The foam catalyst blocks contained about 50 wt. % vanadium-impregnated titania after drying of the wash coated porous ceramic foam.

The reactor, in accordance with an embodiment of the present disclosure, had the same design as the comparison reactor with the exception of having one of the four sides to the square-shaped foam catalyst block open to the gaseous feed. This allowed the gaseous feed to pass through a side of the foam catalyst block as well as through the front face of the catalyst block. To simulate an industrial scale reactor having the catalyst bed module disclosed herein (e.g., with the front face and the top, bottom, and lateral sides open or unsealed), the catalyst bed module used in a bench scale test reactor required a ratio of the total surface area of open sides ($SA_{S1}$) to a total surface area of the front face ($SA_{F1}$) of the catalyst bed module ($SA_{S1}:SA_{F1}$) to be approximately equal to a ratio of the total surface area of open sides ($SA_{S2}$) to a total surface area of the front face ($SA_{F2}$) of the industrial scale reactor having the catalyst bed module of the present disclosure ($SA_{S2}:SA_{F2}$). The ratio of $SA_{S1}:SA_{F1}=SA_{S2}:SA_{F2}$ was accomplished by having one of the four sides and the front face of the catalyst bed module in the bench scale test reactor open and unsealed. For example, for an industrial scale reactor having a catalyst bed module with a pair of foam catalyst block groupings, each grouping having a total dimension of 1392×100 millimeters (mm) and 4 open sides (e.g., top, bottom, and both lateral sides) and an open front face, a total surface area of the 4 open sides is approximately 5600 cm$^2$ and a total surface area of the front face is 19,600 cm$^2$ resulting in an $SA_{S2}:SA_{F2}$ ratio of 0.286. To match the $SA_{S2}:SA_{F2}$ ratio of the catalyst bed module in the industrial scale reactor the bench scale test reactor would need to have a foam catalyst block with dimensions of 300×300×10 mm with 1 open side and an open front face, a total surface area of the single open side is approximately 300 cm$^2$ and a total surface area of the front face is 900 cm$^2$ resulting in an $SA_{S1}:SA_{F1}$ ratio of 0.333, which is substantially equivalent to the $SA_{S2}:SA_{F2}$ ratio of 0.286 corresponding to the industrial scale reactor catalyst bed module.

A natural gas burner was used in the deNOx performance testing of the two reactor modules. The gas had a NOx concentration of 200 ppm and was introduced into the reactors at a rate to provide a space velocity of 18,000 hr$^{-1}$. Injected into the feed gas to the deNOx reactor was a 19% aqueous ammonia solution in an amount to provide an initial concentration of $NH_3$ in the feed gas of 300 ppm. The NOx conversion performance of each reactor was tested at the five different inlet temperatures of 140° C., 160° C., 180° C., 200° C., and 220° C.

Summary results from the performance testing of the deNOx reactor are presented in the following Table 1.

TABLE 1

| Inlet Temperature (° C.) | Fully-Sealed Foam Catalyst Reactor Module (% NOx Conversion) | Open-Sided Foam Catalyst Reactor Module (% NOx Conversion) | Difference in % NOx Conversion |
|---|---|---|---|
| 140 | 42 | 44.8 | 2.8 |
| 160 | 64.7 | 71.9 | 7.2 |
| 180 | 83.5 | 88.5 | 5 |
| 200 | 93.6 | 96.7 | 3.1 |
| 220 | 97.6 | 98.7 | 1 |

The data presented in Table 1 show that the open-sided Foam Catalyst Reactor Module provides a higher NOx conversion at all inlet reactor temperature conditions than the comparative fully-sealed Foam Catalyst Reactor Module. This result is unexpected; since, it was thought that better contact of the feed gas with the foam catalyst block, and therefore a better reaction, would result by passing the entire feed gas flow through the full depth of the foam catalyst block. Instead, by allowing passage of at least a portion of the feed gas flow through the side face of the foam catalyst block, better NOx conversion results. It is noted that the difference in percent NOx conversion narrows as the inlet temperature increases. But, still, even at the higher reactor inlet temperatures, the open-sided foam catalyst reactor module provides for a higher NOx conversion than the fully-sealed foam catalyst reactor module. At the lower inlet reactor temperatures, the NOx conversion differential widens significantly. These data demonstrate that allowing the feed gas to flow into the side of the foam catalyst block of a reactor enhances NOx conversion compared to directing the entire feed gas flow into the front face of the foam catalyst block of a deNOx reactor.

I claim:

1. A reactor configured to contact a gas stream with a catalyst composition, wherein the reactor comprises a catalyst bed module, comprising:
   a first grouping comprising a first plurality of foam catalyst blocks each bounded by a first front face having a first surface area with an opposing first back face, a first top side with an opposing first bottom side, and a first side face with an opposing first alternate side face;
   a second grouping adjacent to the first grouping and comprising a second plurality of foam catalyst blocks each bounded by a second front face having a second surface area with an opposing second back face, a second top side with an opposing second bottom side, and a second side face with an opposing second alternate side face, wherein the first back face of the first plurality of foam catalyst blocks and the second back face of the second plurality of foam catalyst face each other in a spaced relationship;
   a sealing frame disposed between the first and second groupings and configured to maintain the spaced relationship and form a sealed volume between the first plurality of foam catalyst blocks and the second plurality of foam catalyst blocks;
   a support frame comprising a support surface and an opening and configured to support the first grouping and the second grouping, wherein the first grouping and the second grouping are secured to the support surface such that the opening is positioned between the first grouping and the second grouping and adjacent to the sealed volume, and wherein the sealed volume and the opening provide a passage for gas flow.

2. The reactor as recited in claim 1, wherein the sealing frame includes a cross element and extended rim bypass elements, wherein the cross element supports enclosing the sealed volume and maintaining the spaced relationship, and wherein the extended rim bypass elements extend outwardly from and orthogonal to the cross element for a length and supports forming a first gas-tight seal along a first external periphery of the first back face of one or more catalyst blocks of the first plurality of foam catalyst blocks and a second gas-tight seal along a second external periphery of the second back face of one or more catalyst blocks of the second plurality of foam catalyst blocks, wherein the one or more catalyst blocks of the first plurality of foam catalyst blocks and the second plurality of foam catalyst blocks forms at least a portion of an outer perimeter of the first grouping and the second grouping.

3. The reactor as recited in claim 2, wherein the first side face and the first alternate side face of the one or more catalyst blocks of the first plurality of catalyst blocks and the second side face and the second alternate side face of the one or more catalyst blocks of the second plurality of catalyst blocks are substantially open and uncovered to thereby permit gas flow into the first plurality foam catalyst blocks and the second plurality of foam catalyst blocks.

4. The reactor as recited in claim 2, wherein the first back face of the first plurality of foam blocks is substantially open and uncovered other than the first external periphery to thereby permit gas flow into the sealed volume and the second back face of the second plurality of foam blocks is substantially open and uncovered other than the second external periphery to thereby permit gas flow into the sealed volume.

5. The reactor as recited in claim 2, wherein the first external periphery covers from 1 to 40% of said first surface area and said second external periphery covers from 1 to 40% of said second surface area.

6. The reactor as recited in claim 1, wherein the first top side and the second top side of a portion of the first plurality of catalyst blocks and the second plurality of blocks, respectively, are substantially open and uncovered to thereby permit gas flow into the portion of the respective first plurality of foam catalyst blocks and into the second plurality of foam catalyst blocks, and wherein the portion of the first plurality of foam catalyst blocks and the portion of the second plurality of foam catalyst blocks form part of an outer perimeter of the first grouping and the second grouping, respectively.

7. The reactor as recited in claim 1, wherein the first front face of the first plurality of foam catalyst blocks is substantially open and uncovered to thereby permit gas flow into the first plurality of foam catalyst blocks, and wherein the second front face of the second plurality of foam catalyst blocks is substantially open and uncovered to thereby permit gas flow into the second plurality of foam catalyst blocks.

8. The reactor as recited in claim 1, wherein the first bottom side and the second bottom side are substantially open and uncovered to thereby permit gas flow into the first plurality of foam catalyst blocks and the second plurality of foam catalyst blocks.

9. The reactor as recited in claim 1, further comprises: at least one additional grouping of a plurality of foam catalyst blocks oriented on the support surface in a spaced and a side-by-side stacked relationship with the first grouping or the second grouping.

10. The reactor as recited in claim 1, wherein the first plurality of foam catalyst blocks and the second plurality of foam catalyst blocks each comprises porous ceramic foam supporting a catalyst component including a titania carrier and at least one catalytic metal selected from the group consisting of vanadium, molybdenum, tungsten and combinations thereof.

11. The reactor as recited in claim 1, further comprising: a vessel defining a reaction zone having a feed inlet and a treated gas outlet, wherein the reaction zone comprises the catalyst bed module, and wherein the treated gas outlet is fluidly coupled to the passage.

12. A catalyst bed module, comprising:
    a first grouping comprising a first plurality of foam catalyst blocks each bounded by a first front face having a first surface area with an opposing first back face, a first top side with an opposing first bottom side, and a first side face with an opposing first alternate side face;
    a second grouping adjacent to the first grouping and comprising a second plurality of foam catalyst blocks each bounded by a second front face having a second surface area with an opposing second back face, a second top side with an opposing second bottom side, and a second side face with an opposing second alternate side face, wherein the first back face of the first plurality of foam catalyst blocks and the second back face of the second plurality of foam catalyst face each other in a spaced relationship;

a sealing frame disposed between the first and second groupings and configured to maintain the spaced relationship and form a sealed volume between the first plurality of foam catalyst blocks and the second plurality of foam catalyst blocks, wherein the sealing frame comprises a cross element configured to enclose the sealed volume and maintain the spaced relationship and extended rim bypass elements extending outwardly from and orthogonal to the cross element for a length; and a support frame comprising a support surface and an opening, wherein the support frame is configured to support the first grouping and the second grouping, wherein the first grouping and the second grouping are secured to the support surface such that the opening is positioned between the first grouping and the second grouping and adjacent to the sealed volume, and wherein the sealed volume and the opening provide a passage for gas flow.

13. The catalyst bed module as recited in claim 12, wherein the extended rim bypass elements form a first gas-tight seal along a first external periphery of the first back face of one or more catalyst blocks of the first plurality of foam catalyst blocks and a second gas-tight seal along a second external periphery of the second back face of one or more catalyst blocks of the second plurality of foam catalyst blocks, wherein the one or more catalyst blocks of the first plurality of foam catalyst blocks and the second plurality of foam catalyst blocks forms at least a portion of an outer perimeter of the first grouping and the second grouping.

14. The catalyst bed module as recited in claim 13, wherein the first side face and the first alternate side face of the one or more catalyst blocks of the first plurality of catalyst blocks and the second side face and the second alternate side face of the one or more catalyst blocks of the second plurality of catalyst blocks are substantially open and uncovered to thereby permit gas flow into the first plurality foam catalyst blocks and the second plurality of foam catalyst blocks.

15. The catalyst bed module as recited in claim 13, wherein the first back face of the first plurality of foam blocks is substantially open and uncovered other than the first external periphery to thereby permit gas flow into the sealed volume and the second back face of the second plurality of foam blocks is substantially open and uncovered other than the second external periphery to thereby permit gas flow into the sealed volume.

16. The catalyst bed module as recited in claim 12, wherein the first top side and the second top side of a portion of the first plurality of catalyst blocks and the second plurality of blocks, respectively, are substantially open and uncovered to thereby permit gas flow into the portion of the respective first plurality of foam catalyst blocks and into the second plurality of foam catalyst blocks, and wherein the portion of the first plurality of foam catalyst blocks and the portion of the second plurality of foam catalyst blocks form part of an outer perimeter of the first grouping and the second grouping, respectively.

17. The catalyst bed module as recited in claim 12, wherein the first bottom side and the second bottom side are substantially open and uncovered to thereby permit gas flow into the first plurality of foam catalyst blocks and the second plurality of foam catalyst blocks.

18. A process for selective catalytic reduction of nitrogen oxide compounds contained in a gas stream, comprising an NO concentration, an $NO_2$ concentration, or concentrations of both compounds, wherein the process comprises:

introducing the gas stream into a reaction zone defined by a vessel, wherein the reaction zone comprises a catalyst bed module having a first grouping comprising a first plurality of catalyst blocks and a second grouping comprising a second plurality of catalyst blocks, a sealing frame disposed between the first and second groupings and configured to maintain a spaced relationship and form a sealed volume between the first plurality of foam catalyst blocks and the second plurality of foam catalyst blocks, wherein each catalyst block in the first and the second plurality of catalyst blocks comprises a front face with an opposing back face, a top side with an opposing bottom side, and a side face with an opposing alternate side face, wherein the top side, side face, and alternate side face of the first and second plurality of foam catalyst blocks forming an outer perimeter of the first grouping and the second grouping are uncovered, and wherein the first and the second plurality of catalyst blocks are configured to remove the nitrogen oxide compounds;

passing the gas stream through the catalyst bed module under deNOx removal reaction conditions; and recovering a treated gas stream having a reduced concentration of NO or $NO_2$, or both, relative to the NO concentration, the $NO_2$ concentration, or the concentrations of both compounds.

19. The process as recited in claim 18, directing the flow of the gas stream into the front face, the top side, the side face, and the alternate side face of each respective first and second plurality of foam catalyst blocks forming the outer perimeter of the first grouping and the second grouping, wherein the sealing frame comprises a cross element configured to enclose the sealed volume and maintain the spaced relationship and extended rim bypass elements extending outwardly from and orthogonal to the cross element for a length, and wherein the extended rim bypass elements are configured to direct a flow of the gas stream from, the top side, the side face, and the alternate side face into the sealed volume.

20. The process as recited in claim 19, comprising adding a reducing agent to the gas stream.

* * * * *